United States Patent
Beach et al.

(10) Patent No.: US 11,012,683 B1
(45) Date of Patent: May 18, 2021

(54) DYNAMIC CALIBRATION OF SURVEILLANCE DEVICES

(71) Applicant: Alarm.com Incorporated, Tysons, VA (US)

(72) Inventors: Allison Beach, Leesburg, VA (US); Donald Madden, Columbia, MD (US); Weihong Yin, Great Falls, VA (US); David James Hutz, Herndon, VA (US); Dave Conger, Sterling, VA (US); Christopher Silverman, Alexandria, VA (US); Benjamin Asher Berg, Washington, DC (US); Andrew Scanlon, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 67 days.

(21) Appl. No.: 16/145,798

(22) Filed: Sep. 28, 2018

Related U.S. Application Data

(60) Provisional application No. 62/721,662, filed on Aug. 23, 2018, provisional application No. 62/564,677, filed on Sep. 28, 2017.

(51) Int. Cl.
*H04N 17/00* (2006.01)
*G06N 3/08* (2006.01)

(52) U.S. Cl.
CPC ............. *H04N 17/002* (2013.01); *G06N 3/08* (2013.01)

(58) Field of Classification Search
CPC ............. H04N 17/002; H04N 5/23245; H04N 5/23299; H04N 5/23296; H04N 5/23206; H04N 5/232935; H04N 7/181; H04N 5/23216; G06N 3/08; G06N 20/00; G06N 5/042; G06N 3/02; G06N 5/046; G06K 9/2027; G06K 9/00624; G06K 9/6277; G06K 9/72; G06K 9/6223; G16H 30/40; G16H 10/60; G16H 50/30
See application file for complete search history.

(56) References Cited

U.S. PATENT DOCUMENTS

| | | | |
|---|---|---|---|
| 7,382,896 B2 | 6/2008 | Ito et al. | |
| 7,801,330 B2 | 9/2010 | Zhang et al. | |
| 8,872,693 B1 | 10/2014 | Malas et al. | |
| 9,613,296 B1 * | 4/2017 | Rosen | G06K 9/6256 |
| 9,679,007 B1 * | 6/2017 | Feldman | G06F 16/2365 |
| 10,636,173 B1 | 4/2020 | Beach et al. | |
| 2004/0136574 A1 | 7/2004 | Kozakaya et al. | |

(Continued)

OTHER PUBLICATIONS

United States Office Action in U.S. Appl. No. 16/145,858, dated Aug. 5, 2019, 14 pages.

*Primary Examiner* — Lin Ye
*Assistant Examiner* — Tuan H Le
(74) *Attorney, Agent, or Firm* — Fish & Richardson P.C.

(57) ABSTRACT

Methods and systems including computer programs encoded on a computer storage medium, for receiving, from a camera, an image in which the camera detected a particular event based on a first set of camera settings, determining, from the image, that the image is a false positive as the camera falsely detected the particular event, determining that a number of images uploaded by the camera that are false positives satisfies a camera setting generation criteria, and in response, generating a second set of camera settings and providing the second set of camera settings to the camera.

19 Claims, 8 Drawing Sheets

(56) References Cited

U.S. PATENT DOCUMENTS

| | | | |
|---|---|---|---|
| 2004/0179719 A1* | 9/2004 | Chen | G06K 9/00234 |
| | | | 382/118 |
| 2006/0227041 A1 | 10/2006 | Okamoto | |
| 2007/0019073 A1 | 1/2007 | Connaniciu et al. | |
| 2007/0025716 A1 | 2/2007 | Ichinniya | |
| 2010/0091185 A1 | 4/2010 | Ueno et al. | |
| 2011/0157373 A1 | 6/2011 | Ye et al. | |
| 2011/0242278 A1 | 10/2011 | Yang et al. | |
| 2011/0304647 A1 | 12/2011 | Noge | |
| 2013/0147948 A1 | 6/2013 | Higuchi et al. | |
| 2013/0329052 A1 | 12/2013 | Chew | |
| 2014/0374533 A1 | 12/2014 | Ell et al. | |
| 2015/0054820 A1* | 2/2015 | Ji | G06F 3/017 |
| | | | 345/418 |
| 2015/0241962 A1 | 8/2015 | Reznik et al. | |
| 2016/0012293 A1* | 1/2016 | Mate | G06F 16/70 |
| | | | 382/100 |
| 2016/0078583 A1 | 3/2016 | Nishitani et al. | |
| 2016/0092736 A1 | 3/2016 | Mai et al. | |
| 2016/0176343 A1 | 6/2016 | Sakano et al. | |
| 2017/0011519 A1 | 1/2017 | Ohba et al. | |
| 2018/0150704 A1* | 5/2018 | Lee | G06K 9/00805 |
| 2018/0247505 A1* | 8/2018 | Arai | G06K 9/00825 |
| 2019/0075222 A1 | 3/2019 | Oto | |

\* cited by examiner

DYNAMIC CALIBRATION OF SURVEILLANCE DEVICES

CROSS-REFERENCE TO RELATED APPLICATIONS

This application claims the benefit of U.S. Provisional Application No. 62/721,662, filed Aug. 23, 2018 and U.S. Provisional Application No. 62/564,677, filed Sep. 28, 2017. Both of these prior applications are incorporated by reference in their entirety.

TECHNICAL FIELD

This disclosure application relates generally to dynamic calibration of surveillance devices.

BACKGROUND

For a residential-based commercial intelligent surveillance system solution, a low false alarm rate is critical for preventing unnecessary alerts and/or incurring costs associated with false alarms. A primary trigger of false alarms in residential-based commercial intelligent surveillance systems is triggering of false detections and/or misclassification of objects in a camera video feed (e.g., moving tree branches, vehicles, animals, etc.).

SUMMARY

Techniques are described for dynamic calibration of surveillance devices using deep learning to automatically correct for surveillance device miscalibration (e.g., camera parameter assumptions for a surveillance camera) and/or account for environmental factors that may generate false detections. For example, techniques are described for processes including, receiving, by a server, a current set of camera settings, including one or more camera parameters from a camera and a plurality of uploaded detection images, where each uploaded detection image includes a detected object of interest, determining a threshold of false positives, determining a source of the false positive detections as a localized error or a non-localized error, and i) for localized errors select a filter and/or identify a confuser and generate one or more rules based on the confuser or ii) determine to adjust the camera settings including one or more camera parameters, and provide updated camera settings to the camera.

In some implementations, the determination to update the camera settings may be triggered by a non-localized error source including (i) a physical change to the camera, and/or (ii) a size or other attribute of the detected object in the uploaded images has an associated measurement error exceeding a threshold.

Camera calibration can assist in more robust classification of target of interest (e.g., as humans, animals, vehicles). Automatic determination to refine the camera calibration for a camera may reduce costs of operation of the camera. For example, refined camera calibration may result in less false positive detections that may reduce transmission and storage corresponding to false positive images and videos.

In some implementations, the determination to update the camera settings may be triggered by a detection of a localized error source including (i) a temporally localized source, (ii) a spatially localized source, or (iii) a temporally and spatially localized source in a field of view of the camera.

In general, one innovative aspect of the subject matter described in this specification can be embodied in methods that include the actions of receiving, from a camera, an image in which the camera detected an event (e.g., a human target in the field of view of the camera) based on a first set of camera settings, determining, from the image, that the image is a false positive as the camera falsely detected the event, determining that a number of images uploaded by the camera that are false positives satisfies a camera setting generation criteria and in response, generating a second set of camera settings and providing the second set of camera settings to the camera.

Other embodiments of this aspect include corresponding systems, apparatus, and computer programs, configured to perform the actions of the methods, encoded on computer storage devices.

These and other embodiments can each optionally include one or more of the following features. In some implementations, generating the second set of camera settings further includes determining one or more of i) a change to a set of physical camera parameters (e.g., camera tilt-up angle, camera focal length, camera mounting height), ii) a change in operating conditions (e.g., inclement weather, lighting conditions, etc.), or iii) a size or other attribute of an object detected in the uploaded detection images has an associated measurement error exceeding a threshold.

In some implementations, the camera setting generation criteria includes a number of false positive images exceeding a threshold number of false positive images.

In some implementations, determining that the number of images uploaded by the camera that are false positives satisfies the camera setting generation criteria includes determining that the number of images that are false positives exceed a threshold frequency of false positives.

In some implementations, determining that the image is a false positive includes determining a bounding box for an object in the image, determining a classification for the object in the image based on the bounding box, and determining that the classification for the object in the image does not match a provided classification of the object determined by the camera. The classification of the object can be performed by a neural network.

In some implementations, the second set of camera settings is generated using a neural network by processing a set of images in which the neural network has verified that the detections of the particular event in the set of images are true positives and where the neural network generates updated camera parameters using the set of images that are true positives.

In some implementations, the image in which the camera detected the particular event based on the first set of camera settings is one of multiple images or a frame of multiple frames of a video captured by the camera.

In some implementations, the second set of camera settings are an incremental adjustment of the first set of camera settings.

In some implementations, a set of images are received in which the camera detected an event based on the second set of camera settings. A number of false detections in the set of images made by the camera based on the second set of camera settings can be determined to satisfy the camera setting generation criteria and in response, a third set of camera settings can be generated and provided to the camera.

In some implementations, determining that the number of images uploaded by the camera that are false positives satisfies the camera setting generation criteria includes determining whether the images uploaded by the camera that are false positives matches a pattern of false positives. A pattern can be, for example, a concentration of false positives can be determined at a particular time of day (e.g., sunrise), or in a particular area within the field of view of the camera (e.g., a pixel area), or a combination thereof. In another example, a pattern can be determining a number of false positives versus a number of true positives uploaded by the camera (e.g., 3 false positives and no true positives). In another example, a pattern can be determining a pattern of a set of false positives uploaded in a row (e.g., three false positives uploaded in a row).

Another innovative aspect of the subject matter described in this specification can be embodied in methods that include the actions of receiving, from a camera, a set of images in which the camera detected an event based on a first set of camera settings, determining that false detections in the set of images made by the camera based on the first set of camera settings were caused by localized errors (e.g., spatially and/or temporally localized errors), and in response, generating a second set of camera settings based on the localized errors and providing the second set of camera settings to the camera.

In some implementations, a localized error is a confuser. The second set of camera settings can include one or more filters and/or one or more rules, where the filters include instructions to the camera to ignore one or more changes within a specific value range, changes within a specific frequency range, or changes within a specific pixel region of a field of view of the camera, and the one or more rules include instructions to the camera to exclude an area of pixels in images captured by the camera.

In some implementations, the second set of camera settings can be evaluated where determining to evaluate the second set of camera settings includes receiving a sample set of images from the camera in which the camera detected the event based on the first set of camera settings, determining that a number of false positives in the sample set of images from the camera satisfies a camera setting reversion criteria, and providing instructions to the camera that cause the camera to revert to the first set of camera settings. Determining that the number of false positives in the sample set of images from the camera satisfies the camera setting reversion criteria can include determining that the number of false positives in the sample set of images from the camera is less than a threshold number of false positives.

Implementations of the described techniques may include hardware, a method or process implemented at least partially in hardware, or a non-transitory computer-readable storage medium encoded with executable instructions that, when executed by a processor, perform operations.

Particular embodiments of the subject matter described in this specification can be implemented so as to realize one or more of the following advantages. Refining the detection of objects and/or targets of interest by a camera can reduce the number of false positives produced by the camera. Reducing the number of false positives produced by the camera can reduce traffic of data uploaded to a server to verify images, as well as reduce false alerts provided to users of the camera (e.g., a home or business owner). Using a deep neural network to detect false positives and classify objects in detection images reduces the overhead of human experts labeling image data, and additionally can increase privacy such that only the homeowner views the captured image/video data. Reducing false positives can also help avoid missing true events, for example, in the case there where there is a limit (e.g., bandwidth limitation) for how often a camera can process an event (e.g., if the camera can only upload one event per minute, and it uploads a false positive, then a true event for the next minute can be missed).

The details of one or more implementations are set forth in the accompanying drawings and the description below. Other features will be apparent from the description and drawings, and from the claims.

DETAILED DESCRIPTION

Figure 1:
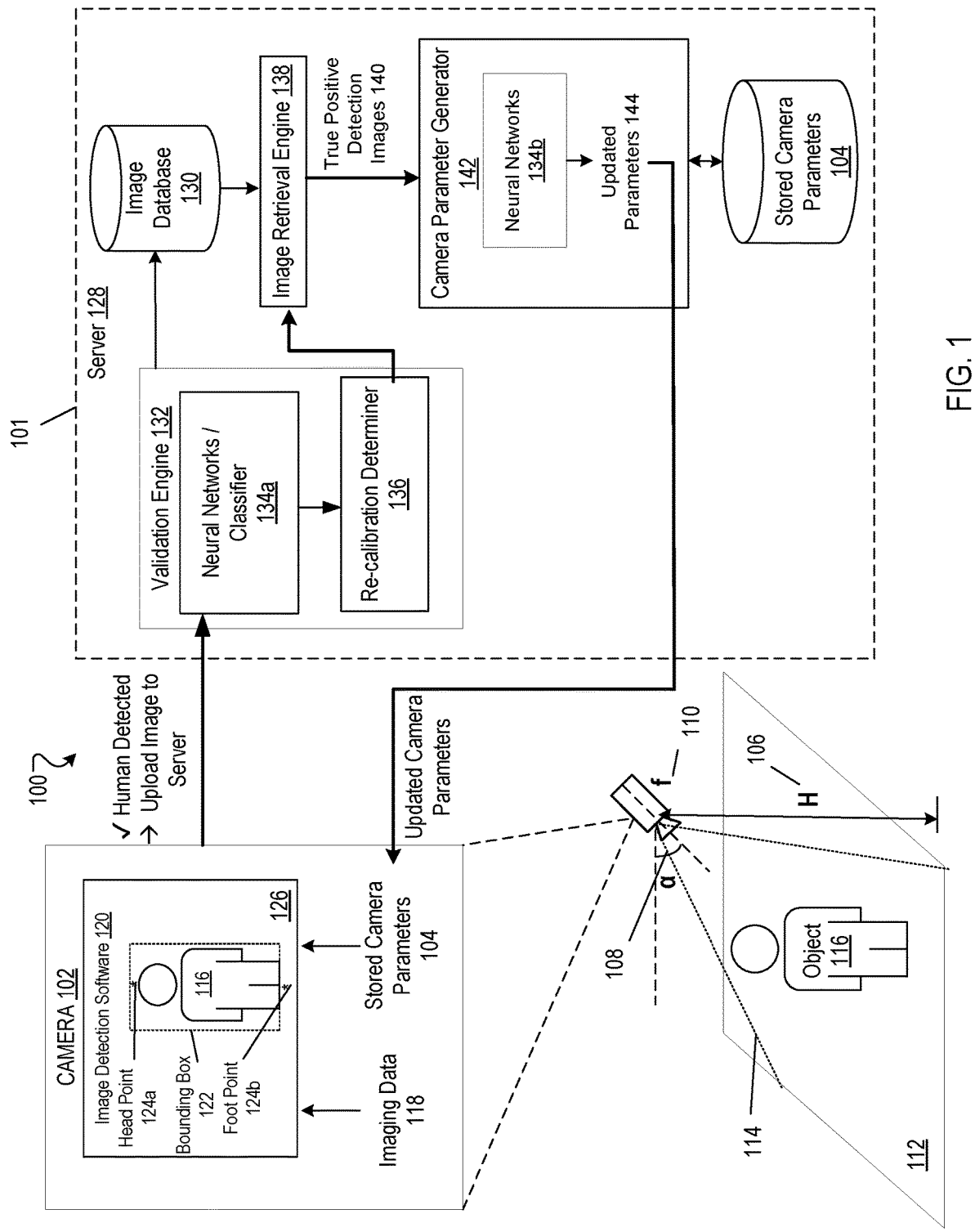
FIG. 1 illustrates an example operating environment for a dynamic camera calibration system.

Techniques are described for dynamic camera calibration using deep learning to automatically correct camera calibration setting assumptions. Camera calibration can be used to refine the interpretation of a video feed of a camera (e.g., improve the accuracy of detections and/or improve the precision of the data for tracking of objects), and may include processes for estimating one or more parameters of the camera, for example, a mounting height, a tilt-up angle, and/or a focal length of the camera. The calibration process may include rough estimates of the one or more parameters provided by an installer of the camera or default parameters stored by the camera. Manual calibration processes can be involved and costly, both for determining that a calibration process is required and for performing a re-calibration of each camera of a system.

Camera settings including camera parameters can additionally include one or more filters and/or one or more rules for interpretation of detections by image detection software for a camera to account for operating conditions and reduce false positive detections.

The camera can use the initial rough estimates of the one or more camera parameters in combination with image detection software to identify and classify objects in a field of view of the camera. Images including objects that are classified as objects of interest (e.g., human targets) may be uploaded to a server for storage and be validated as true positive detections or false positive detections of human targets, by one or more neural networks and/or deep learning algorithms. A true positive detection may be a detection where the camera classified the image as including a human and the server classified the image as also including a human. A false positive detection may be a detection where the camera classified the image as including a human and the server classified the image as not including a human. A server may classify images differently than a camera, for example, the camera's classification may be dependent on camera parameters as the camera may have limited processing and/or power available whereas the server may use a classification that is not dependent on camera parameters.

One or more thresholds for false positive detections or misclassification can be set to trigger an adjustment to camera calibration (e.g., re-calibration of camera parameters). Adjustment to camera calibration can include adding a filter and/or one or more rules related to camera operation. Adjustment to the camera calibration can additionally or alternatively include processing a set of true positive detection images by neural networks to generate updated camera parameters. The updated camera parameters may then be provided to the camera for use with the image detection software.

In some implementations, one or more camera settings can be designated for particular set of operating conditions including one or more localized error sources. A first camera calibration setting can be provided to a camera based in part on a determination that the camera is experiencing a first set of operating conditions, and a second different camera calibration setting can be provided to the camera based in part on a determination that the camera is experiencing a second different set of operating conditions.

FIG. 1 illustrates an example operating environment 100 for a dynamic camera calibration system 101. A camera 102 is installed as a part of a video monitoring system (e.g., a residential-based or small business-based commercial video surveillance system). The camera 102 may include a surveillance camera, night-vision camera, infrared camera, or the like. Camera 102 may be installed indoors or outdoors, and can store information relating to a camera calibration including camera parameters 104 describing the operating environment of the camera. For example, physical parameters can include mounting height (H) 106, tilt-up angle (a) 108, and focal length (f) 110.

In some implementations, mounting height 106 can be defined as a height from a center of camera 102 to the ground plane 112, where the height is four feet above the ground plane 112 (e.g., a mounting height ranging between approximately eight to twelve feet). Mounting height 106 of a camera can depend in part on a selected location of the camera 102 (e.g., indoor versus outdoor camera), and/or a desired field of view 114 of the camera 102 (e.g., mounting higher up for a wider field of view). In some implementations, camera 102 can be mounted on an overhead surface (e.g., on a ceiling) to provide an overhead view.

In some implementations, tilt-up angle 108 can be defined as an angle of tilt of the camera 102 with respect to an axis 109 parallel to the horizon, where a camera 102 that is imaging along the axis 109 (parallel to the ground plane 112) is at 0° degrees, a camera 102 that is imaging at an angle below the axis 109 has a positive tilt angle (e.g., straight down to the ground is +90° degrees), and a camera 102 that is imaging at an angle above the axis 109 has a negative tilt angle (e.g., straight up to the sky is −90° degrees). The tilt-up angle 108 can range between approximately 0° to 90° degrees with respect to the axis 109. The tilt-up angle 108 can depend in part on a location of the camera 102, and/or a field of view 114 of the camera 102. Additionally, the tilt-up angle 108 can depend on the mounting height 106 of the camera 102. For example, a camera 102 mounted on an overhead surface (e.g., ceiling) and pointed straight down will have a tilt-up angle of 90° degrees.

In some implementations, tilt-up angle may be defined with respect to other reference points. For example, a 0° degree reference point for the camera may be when the camera is pointing directly up at the sky or directly down at the ground.

In some implementations, focal length 110 can be defined by one or more optics of the camera 102 (e.g., a distance between a center of the lens of the camera and an image sensor), and can determine a distance at which objects in the camera's 102 field of view 114 are in focus. Focal length 110 can be adjustable (e.g., for a camera 102 with variable distance between lens and image sensor) or can be fixed (e.g., for a camera 102 with a fixed distance between lens and image sensor). The focal length 110 of camera 102 can be selected such that objects captured by camera 102 are at least 6×6 pixels in size. In some implementations, a fish-eye lens or similar type of lens may be used.

A rough estimate of the camera parameters 104 of the camera 102 can be provided during an installation process of the camera 102. For example, information about the mounting height, tilt-up angle, and/or focal length 110 of the camera 102, (e.g., default settings and/or rough estimates), may be provided by the camera manufacturer and/or by an installer of the camera 102. Camera 102 may record images and/or video within a field of view 114 of ground plane 112. Camera 102 may additionally record audio.

In some implementations, camera 102 may record the environment within its respective field of view 114 continuously and may detect objects 116. In particular, an object 116 of interest can be a human, vehicle, or animal target, however, multiple different objects 116 may trigger a detection of an object 116 in the field of view 114 of the camera 102. For example, for outdoor scenarios, moving tree branches, shadows on the ground, vehicle headlights, humans, animals, and bugs may all trigger detection of an object 116 in the field of view 114. In another example, for indoor scenarios, light change (e.g., lights turning on), pets, and humans may all trigger detection of an object 116 in the field of view 114. In the case in which the camera 102 is not triggered to detect an object 116 within its field of view 114, the image detection software does not proceed to process a captured camera image data 118.

In some implementations, camera 102 may record discontinuously and include one or more triggers (e.g., a movement trigger, sound trigger, and change in lighting trigger) for activating a recorded video and/or image. For example, a motion sensor may detect motion of an object 116 within the field of view 114 of the camera 102, and trigger capturing the environment in an image or video clip. In another example, camera 102 may automatically capture scheduled bursts of video and/or images within the field of view of the camera 102 (e.g., every 10 seconds, every 60 seconds, every 5 minutes, or the like).

Camera image data 118 captured by the camera 102 can be processed by image detection software 120 on the camera 102. In some implementations, processing by the image detection software can include drawing a bounding box 122 around a detected object 116 and identifying one or more points 124 of the object 116 within the bounding box 122. For example, identified points 124 may include a head point 124a and a foot point 124b of the object 116 (e.g., a human target). The size and/or relative dimensions of the bounding box 122 and the locations of one or more identified points 124 may be used to determine a real-world size of the object 116.

In some implementations, a mapping is generated for the camera 102 from the world coordinates (e.g., the operating environment of the camera 102) to the image coordinates of the image 126. The mapping between world coordinate and image coordinate can be generated using camera parameters 104, for example, mounting height 106, tilt-up angle 108, and focal length 110.

In some implementations, the image detection software 120 includes a classifier to identify and classify object 116 as a class of object. For example, a class of object 116 can include human, animal, vehicle, vessels, bug, nature, or the like. For each class of object, the image detection software 120 may include a database of physical properties of the class of object (e.g., size, speed, relative locations of features, etc.). In some implementations, the mapping between image and world coordinates may be used to create a database which stores average features of various objects (e.g., average human feature locations and size) to assist in object classification. For example, the image detection software 120 may include a database of human targets, including average human target size (e.g., size of bounding box containing a human target) and relative location points for the head point 124a and foot point 124b.

In some implementations, object classification using the image detection software 120 may include one or more object models (e.g., human model, animal model, vehicle model) that include information related a respective object 116 (e.g., a human target, animal, vehicle). An object model may include information related to object size/dimensions, locations of one or more features, movement speed, or the like. For example, a human model may include information about average human height and relative locations of a human target's head and foot position.

The image detection software 120 may additionally include one or more filters that can reduce noise based in part on target size and physical speed (e.g., to filter out triggers from birds or bugs). Camera settings can include one or more filters, where the one or more filters suppress an upload of a detection image that are triggered, for example, due to environmental factors (e.g., inclement weather, lighting conditions, and the like). Further details related to the one or more filters is discussed below with reference to FIGS. 4-6.

Image 126 including an object 116 can be processed by the image detection software 120 and object 116 may be classified as a target of interest (e.g., a human target, a vehicle target, etc.). In some implementations, the identification of a human target in image 126 results in the image 126 being uploaded to server 128 and stored on the server 128 in an image database 130 which includes all uploaded images from camera 102. In some implementations, camera 102 and server 128 are connected over a network (not shown). The network can be, for example, a local area network (LAN), the Internet, or a combination thereof that connects the camera 102 and server 128. The server 128 can include multiple different servers in communication directly or over the network.

Validation engine 132 can verify the human targets identified in the images 126 uploaded to the image database 130 by the image detection software 120 on camera 102. In some implementations, validation engine 132 verifies every image 126 uploaded by camera 102 and stores the images in the uploaded image database 130. Validation engine 132 may instead select a sampling of the uploaded images 126 in the uploaded image database 130 to verify the human targets identified by the image detection software 120 on camera 102. For example, validation engine 132 may sample 20% of the uploaded images 126, e.g., every fifth uploaded image.

Validation engine 132 can include one or more neural networks 134a and/or deep learning algorithms that may be used to detect objects 116 in an image 126 and classify an object 116 detected in the image 126. The one or more neural networks 134a may detect and classify object 116 using one or more processes that are independent of the camera parameters 104. In some implementations, the one or more neural networks 134a are trained with a set of training images provided from a like environment.

Validation engine 132 using neural networks 134a may then classify the object 116 (e.g., human target) that was identified by the image detection software 120 of the camera 102. In some implementations, the validation engine 132 identifies (e.g., associates a label or tag to the image) each verified image as a true positive detection (e.g., validating the human target detected and classified by the image detection software 120), or a false positive detection (e.g., invalidating the human target detected and classified by the image detection software 120). For example, if the neural networks 134a determine that the object 116 in image 126 is an object class "animal" (e.g., a dog) and not a human target, the image 126 will be identified as a "false positive" detection.

Validation engine 132 may track the number of uploaded images in the image database 130 that have been validated by the validation engine 132 and identified as either "false positive" or "true positive" detections. In some implementations, the validation engine 132 may track a number of false positive detections it identifies in the uploaded images stored on the uploaded image database 130. A recalibration threshold may be set to trigger a recalibration process (e.g., recalibration process described with reference to FIG. 2).

In one example, the validation engine 132 identifies a number of false positive detections above the recalibration threshold and determine that a source of the false positive detections is a non-localized error. Based on the determined source of false positive detections, the re-calibration determiner 136 of the validation engine 132 will determine to recalibrate one or more of the camera parameters 104 of the camera 102. Generation of the new camera parameters is described in more detail below with reference to FIG. 2.

In another example, the validation engine 132 can identify that a number of false positive detections is above the recalibration threshold and determine that a source of the false positive detections is a localized error. Based on the determined source of false positive detections, the validation engine 132 can determine to generate a filter and/or one or more rules to apply to the camera 102. Generation of a filter and/or one or more rules is discussed in more detail below with reference to FIGS. 4-6.

In some implementations, an image retrieval engine 138 can retrieve all true positive detection images 140 from the image database 130. True positive detection images 140 may include all uploaded images from camera 102 that have been verified by the validation engine 132 to include a target of interest (e.g., a human target) as the object 116. In some implementations, true positive detection images 140 includes a sampling or sub-set of all uploaded images from camera 102 that have been verified by the validation engine 132 to include a human target at the object 116. For example, a sub-set of 10 validated true positive detection images 140 may be retrieved by the image retrieval engine 138.

A camera parameter generator 142 can process the true positive detection images 140 to determine updated camera parameters 144 (e.g., H', f', α'). In some implementations, server 128 stores the current camera parameters 104 and/or can access stored camera parameters 104 from camera 102. The camera parameter generator 142 may use the current stored camera parameters 104 as a starting point for generating updated physical parameters 144. The camera parameter generator 142 may use one or more neural networks 134b and/or deep learning algorithms to calculate and/refine the physical camera parameters 144 (e.g., H', f', α').

In some implementations, the physical camera parameters 144 are refined using the known stored camera parameters 104 and using the true positive detection images as follows: object type (e.g., human target), image size, and a particular location within the field of view of the camera are determined from the true positive detection images by the one or more neural networks 134b. An estimate is made of the same attributes (e.g., object type, image size, and a particular location within the field of view of the camera) of the object in each true positive detection image using the stored parameters 104, and then a fitting error is computed between the estimated sample and the attributes determined by the neural networks 134b for the true positive detection images. The operation is then iterated while adjusting the physical camera parameters 144 (e.g., H', f', α'), where one or more of the physical camera parameters 144 is adjusted in each iteration and compared to the attributes determined by the neural networks from the true positive detection images. The refining process terminates and the new physical camera parameters 144 are found when a minimum fitting error is reached.

The server 128 may then send the updated camera parameters 144 to the camera 102, to be used by the image detection software 120 as stored camera parameters 104.

Figure 2:
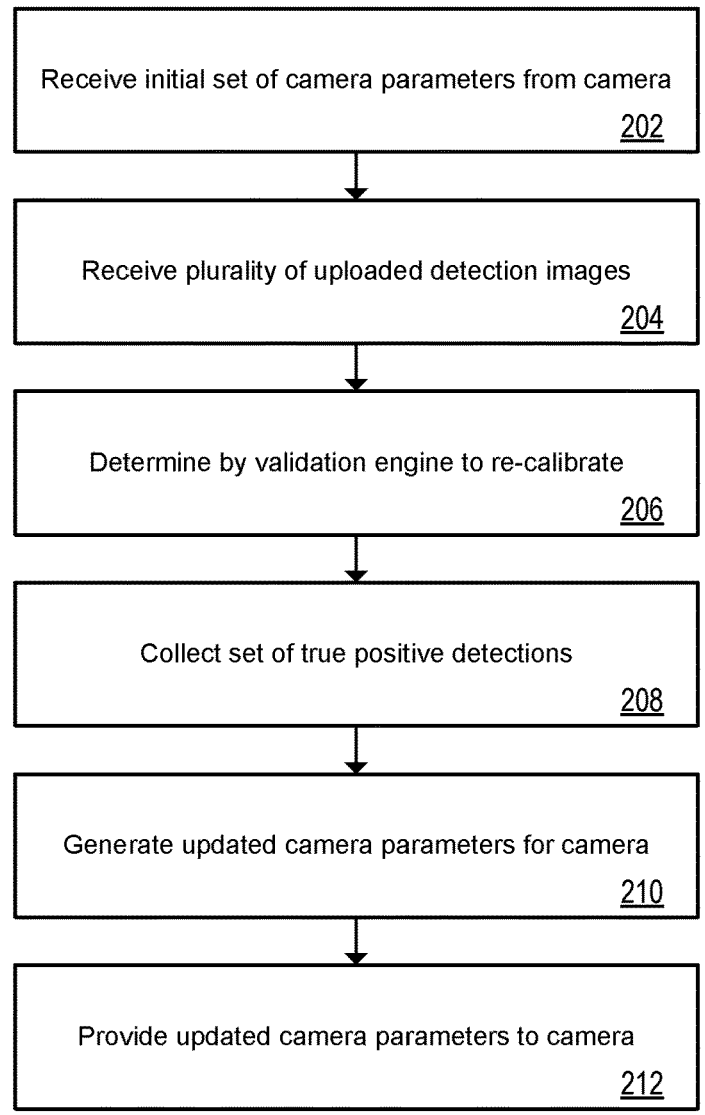
FIG. 2 is a flow diagram of an example process for a dynamic camera calibration.

FIG. 2 is a flow diagram of an example process 200 for a dynamic camera calibration. An initial set of calibration settings (e.g., camera parameters 104) are received from a camera (e.g., camera 102) by a server (e.g., server 128) (202). Camera parameters 104 may include information related to the camera's physical position (e.g., mounting height 106, tilt-up angle 108, etc.) and/or the camera's operating parameters (e.g., focal length 110, zoom, etc.). The initial set of calibration settings may be provided during a set-up process for the camera 102. For example, an installer (e.g., homeowner or installation professional) may measure relevant physical parameters and provide these calibration settings to the server 128 and/or to the image detection software (e.g., image detection software 120) of the camera 102. The initial set of camera parameters 104 (e.g., focal length, zoom) may be provided to the image detection software 120 and/or the server 128 by a manufacturer of the camera 102.

Using the initial set of camera parameters 104, camera 102 can operate and capture video and/or images within a field of view (e.g., field of view 114) of the camera 102. Camera 102 may include image detection software 120 to process the captured video and/or images 126 from camera 102 and detect objects 116 within the field of view 114 of the camera 102. In some implementations, image detection software 120 detects and classifies objects 116 into different object classes (e.g., human, animal, vehicle, plant, etc.) and uploads detected human target objects to the server 128. In the case in which an object 116 is not detected within the field of view 114 of the camera 102, no processing (e.g., no classification step) of the captured video and/or images 126 occurs.

The server 128 may then receive multiple uploaded detection images 126, each uploaded image including at least one identified object of interest (e.g., human target) (204). The uploaded images may be stored on the server 128 in an image database (e.g., image database 130). Images may be uploaded periodically (e.g., a push of images to the server 128 at a particular interval), or may be uploaded to the server 128 as they are captured and a human target is positively identified by the image detection software 120.

A re-calibration determiner 136 of the validation engine 132 can determine to re-calibrate the one or more camera parameters (206). A validation engine (e.g., validation engine 132) may verify a sub-set (e.g., 50% sample of uploaded detection images) or all of the uploaded detection images in the uploaded image database 130. Validation engine may use neural networks 134a and/or deep learning algorithms to analyze each image 126 in order to detect and classify objects 116 within the image 126. The object 116 may be determined to be a human target based in part on the deep-learning algorithm bounding box and classification of the object 116.

The validation engine 132 may determine, using the results from the deep learning algorithm analysis of the image 126 that the object 116 in the image 126 is a human target and identify (e.g., associate a label or tag) the image 126 as a "true positive" detection by the image detection software 120 on camera 102. Conversely, if the validation engine 132 determines, using the results from the deep learning algorithm analysis of the image 126, that the object 116 is not a human target (or if not object 116 exists in the image 126), then the image 126 is labeled (e.g., associate a label or tag) as a "false positive" detection.

The determination to re-calibrate may depend on various factors, including one or more thresholds. For example, the determination to re-calibrate may be triggered by (i) a physical change to the camera 102, for example, the camera 102 may be moved (e.g., repositioned) or the camera 102 zoom and/or focal length may be altered, (ii) a number or frequency of "false positive" detections in the uploaded images from camera 102 may exceed a threshold amount or frequency, (iii) a change in operating conditions, and/or (iv) a size or other attribute of the object (e.g., object 116) detected in the uploaded images has an associated measurement error exceeding a threshold (e.g., a dimension of the detected human targets is 20% off). Further details concerning the determination to re-calibrate are discussed below with reference to FIGS. 3A-B and 5 below.

A set of true positive detections is collected by the image retrieval engine (208). A number of true positive detection images (e.g., true positive detection images 140) used to generate the set of true positive detection images 140 may include a minimum of three bounding boxes 122, each surrounding a respective positively identified human target, and where each bounding box 122 can be located at a different position within the field of view of the camera 102.

A camera parameter generator (e.g., camera parameter generator 142) can use one or more neural networks and/or deep learning algorithms to analyze the true positive detection images 140 to determine one or more physical camera parameters 144 (e.g., parameters H', f', α') (210). In some implementations, the camera parameter generator 142 uses stored camera parameters 104 (e.g., stored on the server 128 or on the camera 102) as a starting point for generating updated parameters 144. For example, the camera parameter generator 142 uses stored camera parameters 104 and the set of true positive images 140 to determine a bounding box and classify the detected object 116 in each image from positive detection images 140, in a same process as implemented by the image detection software 120, and compare these results to objects 116 detected and classified using the neural networks 134a in the image. The camera parameter generator 142 can then adjust the camera parameters 104 until the detected objects 116 match the results (or are within a desired minimum threshold of error) from the neural network 134a analysis. In some implementations, the bounding box 122 and object detection information (e.g., head point 124a and foot point 124b) from the image detection software 120 on the camera 102 can be used.

The updated parameters 144 are provided to camera 102 (212). In some implementations, the re-calibration process includes multiple iterations of refinement, including one or more rough estimations of camera parameters 104 and a subsequent fine estimation of camera parameters 104. For example, an initial set of parameters 104 may be provided upon installation of the camera, and two or more refining re-calibration processes, as described with reference to FIG. 2, may occur until a subsequent fine re-calibration process to yield final camera parameters 104. In some implementations, once the final camera parameters 104 are found, re-calibration of the camera parameters 104 is not required unless a physical change is made to the camera 102 or the environment. For example, if camera 102 is moved or a zoom level is adjusted.

Figure 3A:
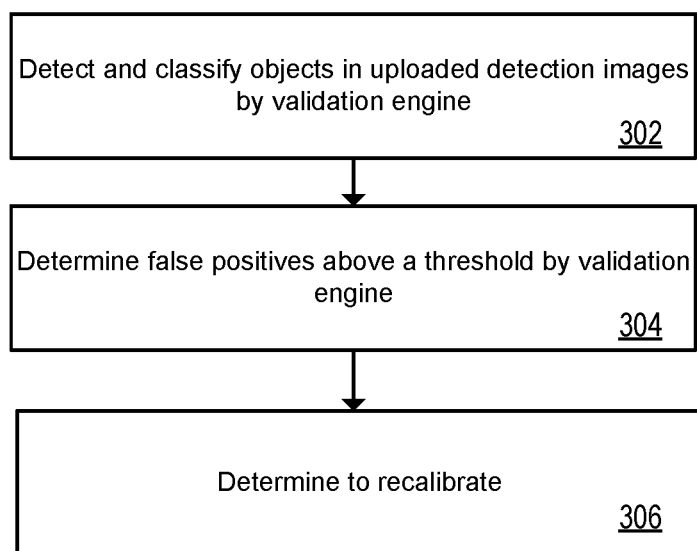
FIG. 3A is a flow diagram of an example process for determining to re-calibrate the camera parameters.

FIG. 3A is a flow diagram of an example process 300 for determining to re-calibrate the camera parameters 104. Uploaded detection images 126 are analyzed by the validation engine 132 which detects and classifies objects 116 in the uploaded detection images stored in the image database 130 (302). In some implementations, one or more neural networks 134a and/or deep learning algorithms are used to analyze the uploaded images in the uploaded image database 130. Objects 116 are detected in each uploaded image of the uploaded image database 130 and classified using one or more classifiers. Classification of objects 116 can include assigning a class of object to each object 116 (e.g., human target, animal, vehicle, etc.). In some implementations, the validation engine may determine that one or more of the uploaded images 130 represent a false positive detection by the image detection software 120 on camera 102.

False positive detections may include non-object detection (e.g., no object 116 is found in the image). For example, a camera 102 may upload an image 126 that was triggered by a moving vehicle or branch of a tree. False positive detections can be triggered by operating conditions, for example, by inclement weather (e.g., rain or wind), lighting changes (e.g., sun setting), or a combination thereof. Operating conditions that can affect object detection is discussed in more detail below with reference to FIGS. 4-7.

In some implementations, false positive detections that are triggered by operating conditions can result in a determination to adjust the camera settings for camera 102, for example, by applying a filter and/or one or more rules. Examples of the filters and rules that can be applied to the camera 102 settings are discussed in more detail with reference to FIG. 4 below.

False positive detections may also include misclassification (e.g., a human target is identified when the object is actually an animal). Misclassification may occur when a bounding box 122 is incorrectly determined (e.g., too large or small relative to actual size of object) and/or when one or more location points 124 are misidentified (e.g., a head point 124a is assigned to a shoulder of a human target). Misclassification may result from one or more of the camera parameters 104 being incorrect. For example, the image detection software may classify an object 116 that is a house cat to be a human target if the focal length 110 of the camera 102 is incorrectly identified in the camera parameters 104 (e.g., is larger than the actual focal length). An incorrectly large focal length 110 would result that the house cat being interpreted to be larger than it actually is in real-life.

The validation engine 132 can determine that a number and/or percentage of false positive detections in the uploaded image database 130 is above a threshold of false positive detections (304). A threshold of false positive detections can range between 5%-20% of total volume of uploaded images from the camera 102. The threshold may additionally apply over a period of time (e.g., 5%-20% false positive detections of total uploaded images over a one day or a one week period). In some implementations, the false positive detections are tracked and the validation engine will determine to re-calibrate once the number of false positive detections reaches a particular value (e.g., 20 false detections). The threshold for false positive detections may depend on cost considerations, for example, more uploads of false positive images requires more server-side analysis and can increase operating costs.

Based on the determination that the false positive detections (e.g., number and/or percentage) are above the threshold, the validation engine 132 determines to recalibrate the camera parameters 104 (306). The process for recalibration of camera parameters follows as described above with reference to FIG. 2. In some implementations, a determination by the validation engine 132 to re-calibrate can be followed by a determination of a source of the false detections, as discussed in further detail below with reference to FIG. 4.

Figure 3B:
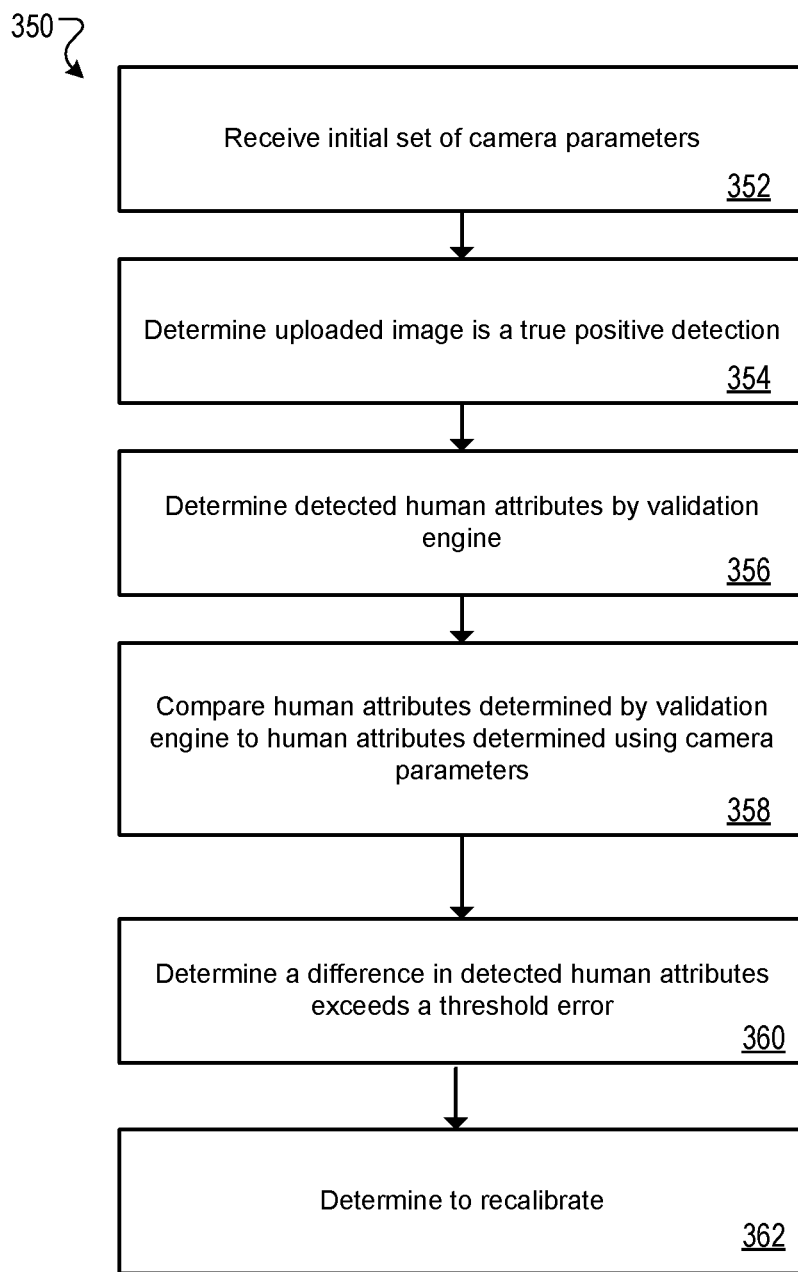
FIG. 3B is a flow diagram of another example process for determining to re-calibrate the camera parameters.

FIG. 3B is a flow diagram of another example process 350 for determining to re-calibrate the camera parameters 104. Validation engine 132 on server 128 can receive an initial set of camera parameters 104 (352) from the camera 102. The initial set of camera parameters 104 may include, for example, mounting height, focal length, and tilt-down angle, and may be provided to the camera 102 when the camera 102 is installed (e.g., by an installer or the manufacturer). For simplicity, a target of interest is a human target for the process described with reference to FIG. 3B, however, many other targets of interest could be possible (e.g., a vehicle target, an animal target, or another target of interest).

Validation engine 132 receives multiple uploaded detection images from camera 102 that may be stored on the server 128 in an image database (e.g., uploaded image database 130). Each image of the uploaded images represents a positive detection and classification of an object as a human target by the image detection software 120 of camera 102. For example, camera 102 may upload 5 images each with an object 116 classified as a human target by the image detection software 120. The validation engine 132 processes the uploaded images from the image database 130 using neural networks 134a to determine if the uploaded image represents a false positive detection or a true positive detection, as described in more detail with reference to FIGS. 2 and 3A.

An uploaded image is determined to be a true positive detection (354). A true positive detection represents an image that was uploaded by the camera 102 where the image detection software 120 detected and classified an object 116, for example, as a human target, a vehicle target, or another target of interest and the validation engine 132 also confirmed a detection and classification of the object 116 in the uploaded image as a human target.

The validation engine may then proceed to determine one or more human attributes (e.g., size, feature location, movement) in the uploaded image (356). In some implementations, the determination of one or more human attributes includes assigning a bounding box (e.g., bounding box 122) to the object 116 by the neural networks 134a. The determination of one or more human attributes may also include identifying one or more features (e.g., a head point, a foot point) of the human target.

In some implementations, a target of interest is a vehicle target. The determination of one or more vehicle attributes may also include identifying one or more features (e.g., a center point of a roof, points of contact between the vehicle tires and the roadway) of the vehicle target.

The human attributes (e.g., bounding box and feature locations) determined by the validation engine 132 are compared to human attributes (e.g., bounding box and feature locations) determined by the image detection software 120 of the camera 102 using the camera parameters 104 (358). For example, a bounding box determined by neural networks 134a may be of a different size (e.g., different dimensions) than a bounding box 122 determined by the image detection software 120 on the camera 102 using the camera parameters 104. In some implementations, the validation engine 132 uses the stored camera parameters 104 on server 128 to calculate the human attributes (e.g., bounding box 122 and feature locations 124a, 124b) as they would be calculated by the camera 102 rather than using the human attribute information provided by the camera 102 with the uploaded image 126 (e.g., in order to save processing power and/or reduce cost of operation).

The validation engine may determine that a difference in the human attributes determined by the neural networks 134a and the human attributes determined by the image detection software 120 on camera 102 (e.g., by using camera parameters 104) exceeds a threshold error (360). In some implementations, a threshold error ranges between approximately 5%-20% in the size or location of human attributes. For example, the size of the bounding box determined by the neural networks 134a may vary by 10% when compared to the bounding box determined by the image detection software 120 on camera 102 using camera parameters 104.

In response to determining that the error in human attributes exceeds a threshold error, the validation engine 132 may determine to re-calibrate the camera parameters (362). The process for recalibration of camera parameters follows as described above with reference to FIG. 2.

In some implementations, multiple cameras 102 image an environment and each provide uploaded detection images to server 128 for validation. The multiple cameras 102 may operate independently of each other, where a determination to re-calibrate a first camera of the multiple cameras 102 does not trigger a re-calibration of any other camera of the multiple cameras 102. A particular camera of a set multiple cameras 102 can have a different calibration (e.g., a different set of camera parameters) from each other camera in the set of multiple cameras, based in part on the area imaged by a field of view of the particular camera. For example, a particular camera may be configured to image an area outside a home that includes multiple trees, where the trees can trigger false detections.

Figure 4:
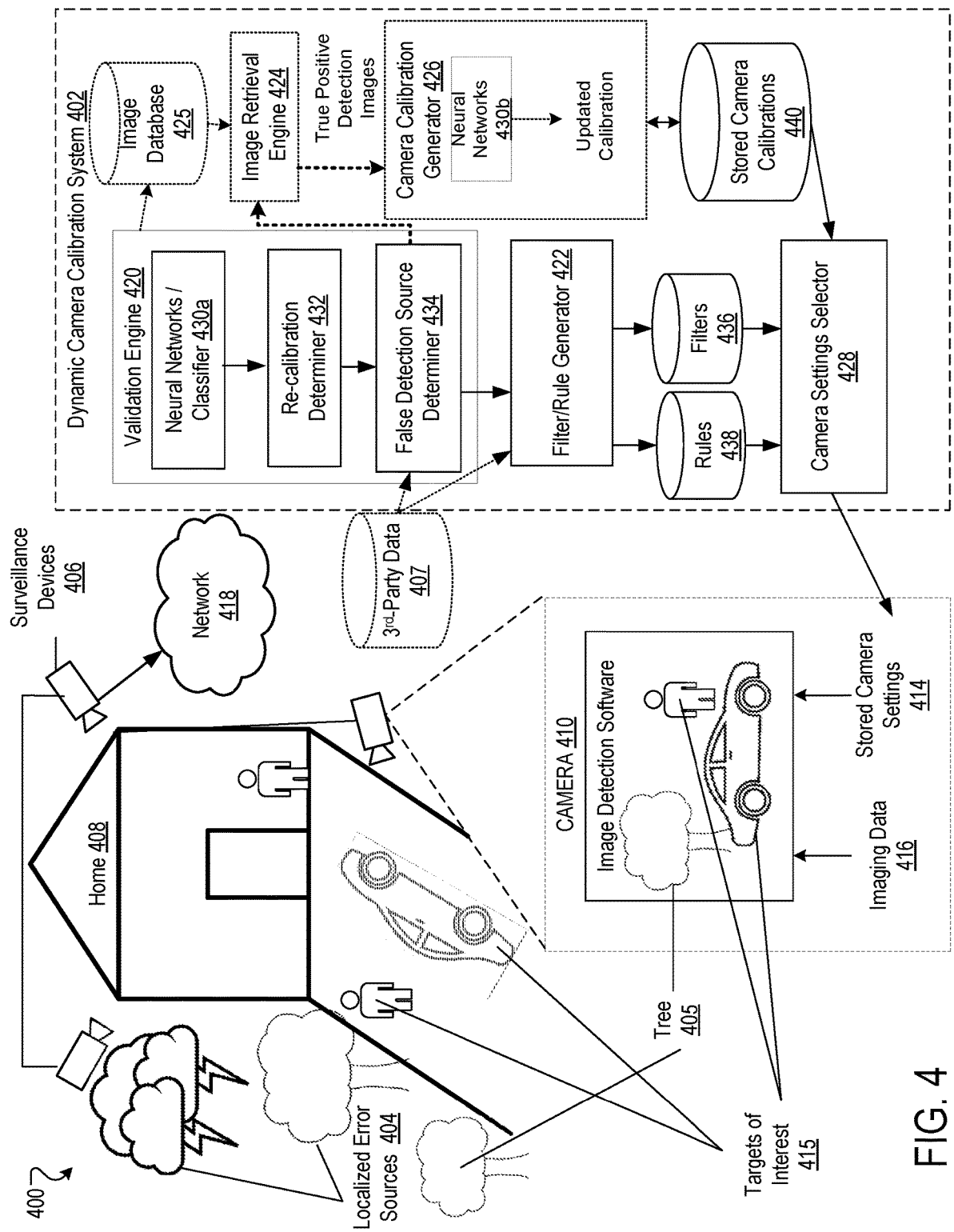
FIG. 4 illustrates an example operating environment for a dynamic camera calibration system including localized and/or non-localized error sources

FIG. 4 illustrates another example operating environment 400 for a dynamic camera calibration system 402 including localized and non-localized error sources that can result in false positive detections by surveillance devices. Non-localized errors sources, e.g., due to miscalibration of camera parameters (e.g., camera parameters 104) or bounding box errors, are described in more detail with reference to FIG. 1. Localized error sources 404 may be sources of errors that can affect the performance of the dynamic camera calibration system 402 (e.g., cause false positive detections and/or interrupt a true positive detection) in a localized manner. Localized manner may refer to a temporal and/or spatial localization within a field of view of one or more surveillance devices 406. For example, a localized source of error that is spatially localized may include objects (e.g., tree 405, garbage bag, swing set, tarps, puddles, garden gnomes/statues, bird feeders) within a detection range of one or more surveillance devices 406 (e.g., field of view of a security camera, sensing range of an IR movement detector, etc.) that can interrupt a detection of a true positive detection or cause a false positive detection. In another example, a localized source of error that is temporally localized can include inclement weather, for example, rain, snow, wind, or the like. Localized error sources 404 can also include lighting conditions, for example, a glare from the sun or other light source (e.g., a porch light), shadows created by lighting sources, low light conditions (e.g., dusk or sunrise) that can create low contrast conditions, or the like.

In some implementations, a localized source of error can be a television where images on the television (e.g., a person on in a television program) can cause a false positive detection. A localized source of error can be an automated item (e.g., a PTZ camera, a clock with a pendulum, automated sprinklers) that can trigger false positive detections. A localized source of error can be an object that is falsely recognized as target of interest by a lightweight on-board classifier for a surveillance device, for example, a golf-bag leaning up against a railing can be falsely classified as a human target, or an architectural feature can be falsely classified as a vehicle target based on appearance and/or how light moves over the feature.

In some implementations, a localized source of error can be identified based in part on features of the localized source of error, for example, a size of an object, a speed with which the object is moving, a direction of motion, a consistency of a direction of motion, a color of the object, a shape of the object, or the like. For example, a localized source of error can be a tarp blowing in the wind that moves in a periodic back-and-forth manner. The combined features, e.g., physical appearance of the tarp, movement characteristics, can result in the dynamic camera calibration system 402 identifying the tarp as a localized error source.

Localized errors have an associated temporal and/or spatial quality, where the source of the error may be restricted, for example, to a same spatial location (e.g., same pixel in the field of view of the camera), or occur with a regular periodicity (e.g., occur at a same time every day). A localized error can be caused by sources including, for example, inclement weather, delivery or other regular service vehicles, animals or insects, foliage, or the like. In one example, inclement weather such as rain/snowfall, wind, or other stormy conditions can cause a camera 410 to move (e.g., camera jitter) or to register movement due to the inclement weather (e.g., ice falling in front of the camera lens). In another example, spider web across a portion of the camera 410 lens can trigger a false positive detection. In yet another example, glare from the sun can affect camera 410 at a same time each day (e.g., at sunset) and can trigger a false positive detection.

In some implementations, a localized error can be triggered by a source that is temporally and/or spatially localized and is not of interest to a user (e.g., a homeowner) of a home monitoring system of home 408. For example, a localized error is a mail truck that drives by home 408 every day between 11:00-11:30 AM may not be a target of interest (e.g., not a security concern to the homeowner). The motion of the mail truck may trigger a detection by the camera 410, and result in a false positive detection by the camera 410.

Non-localized error sources are errors that can cause false positive detections by a camera 410 and that are not localized spatially and temporally. Non-localized error sources can be bounding box errors and misclassification of objects in the image data, as discussed in more detail above with reference to FIGS. 1, 2, and 3A-B. For example, a non-localized error can be caused by incorrect camera parameters used by the camera 410 when detecting objects in the field of view of the camera. In another example, a non-localized error can be a misclassification of an object as a human target when the object is an animal target.

The dynamic camera calibration system 402 can provide home monitoring services for home 408 including, for example, a house, driveway, backyard, and surrounding areas. Home 408 can include one or more localized error sources 404 including trees, outdoor floodlights, a swing set, etc. Each surveillance device 406 monitoring the home 408 can have a different detection area (e.g., field of view) of the home 408. Surveillance devices 406 can include for example, camera 410 (e.g., camera 102 depicted in FIG. 1), motion sensors, pressure sensors, sound detectors, and the like. Each of the surveillance devices 406 can collect monitoring data (e.g., image data, sensor data, etc.) within a field of view of the surveillance device 406. As depicted in FIG. 4, a field of view of the camera 410 includes a view of a driveway of home 408 and a tree 405 near the driveway.

Camera 410 may include a surveillance camera, night-vision camera, infrared camera, or the like. Camera 410 can be installed indoors or outdoors. Camera 410 can include image detection software 412 and a stored camera settings 414 (e.g., stored camera parameters 104) describing the camera's operating environment. Camera 410 can perform image detection and classification of objects locally, and can store some or all of the collected image data locally, for example, store collected image data for a period (e.g., 24 hours, 2 weeks, etc.).

As described with reference to camera 102 depicted in FIG. 1, camera 410 can perform image detection and classification of targets of interest 415 (e.g., human targets, vehicles, etc.) using, for example, bounding boxes, in the collected imaging data 416 and upload positive detections to the dynamic camera calibration system 402 over the network 418 (e.g., network 418). For example, as depicted in FIG. 4, a target of interest 415 (e.g., a human or a vehicle) is detected in the imaging data 416 of camera 410. The imaging data 416 depicting the identified positive detection is provided to the dynamic camera calibration system 402.

The dynamic camera calibration system 402 includes a validation engine 420 (e.g., validation engine 132), a filter/rule generator 422, an image retrieval engine 424 (e.g., image retrieval engine 138), a camera calibration generator 426, and a camera setting selector 428. Though depicted in FIG. 4 as a validation engine 420, a filter/rule generator 422, an image retrieval engine 424, a camera calibration generator 426, and a camera setting selector 428, the functions can be performed by fewer or more than the depicted modules.

Validation engine 420 includes neural networks/classifier module 430a, re-calibration determiner 432, and false detection source determiner 434. As described above with reference to FIG. 1, validation engine 420 (e.g., validation engine) may determine from the uploaded detection images provided by camera 410 (e.g., camera 102), that a threshold of false positive detections are uploaded by the camera 410 and that the stored camera settings 414 require updating. Stored camera settings 414 can include a wide range of parameters, calibrations, filters and rules that can be configured on edge analytics, even including altering which set of algorithms to run, in additional to camera parameters (e.g., camera parameters 104) described above with reference to FIG. 1.

Based on a determination that the stored camera settings 414 require updating, the false detection source determiner 434 can determine, using image data 416, one or more sources (e.g., localized and/or non-localized sources) of the false detections in the uploaded imaging data 416 from camera 410. The false detection source determiner 434 determines that a source of one or more false positive detection in the uploaded image data from the camera 410 is a localized error or a non-localized error. For example, the false detection source determiner 434 can determine that a source of a false detection by camera 410 is localized error, e.g., a branch from a tree 405 that is moving due to wind. In another example, the false detection source determiner 434 can determine that a source of a false detection by camera 410 is due to a non-localized error, e.g., that the camera parameters for the camera 410 are miscalculated.

For determined source that is a localized error by the false detection source determiner 434, the dynamic camera calibration system 402 can utilize the filter/rule generator 422 to generate a filter and/or one or more rules that can be applied to current stored camera settings 414 of camera 410. One or more of a filter 436 and rule 438 generated by the filter/rule generator 422 can be provided to the camera 410 by the camera settings selector 428 responsive to a determined localized error.

In some implementations, a determined source is a non-localized error, and the dynamic camera calibration system 402 can generate updated camera settings 414 for the camera 410 using, for example, the image retrieval engine 424 (e.g., image retrieval engine 138), camera calibration generator 426 (e.g., camera parameter generator 142), and image database 425 (e.g., image database 130), as described above with reference to FIGS. 1-2.

The dynamic camera calibration system 402 can store generated camera calibrations 440 that can be accessible to the camera settings selector 428 to provide to camera 410. For example, a camera 410 may have a stored camera calibration 440 for daylight hours and a second stored camera calibration 440 for nighttime hours (e.g., infrared mode). The camera settings selector 428 may select a stored camera calibration 440 for camera 410 depending, for example, on a time of day, environmental conditions (e.g., inclement weather), or a determined orientation of the camera (e.g., a tilt-up angle for a camera).

In some implementations, third-party data 407 including, for example, weather data, can be utilized by the dynamic camera calibration system 402 to determine a localized error source 404. For example, weather data can indicate that a snowstorm is in the geographical area including the dynamic camera calibration system 402, such that the dynamic camera calibration system 402 can adjust the camera settings 414 for surveillance devices 406 preemptively. Third-party data 407 can include sunset/sunrise data and can be utilized by the dynamic camera calibration system 402 (e.g., in combination with a relative orientation of the surveillance device 406) to determine that a localized error source 404 is due to glare.

Figure 5:
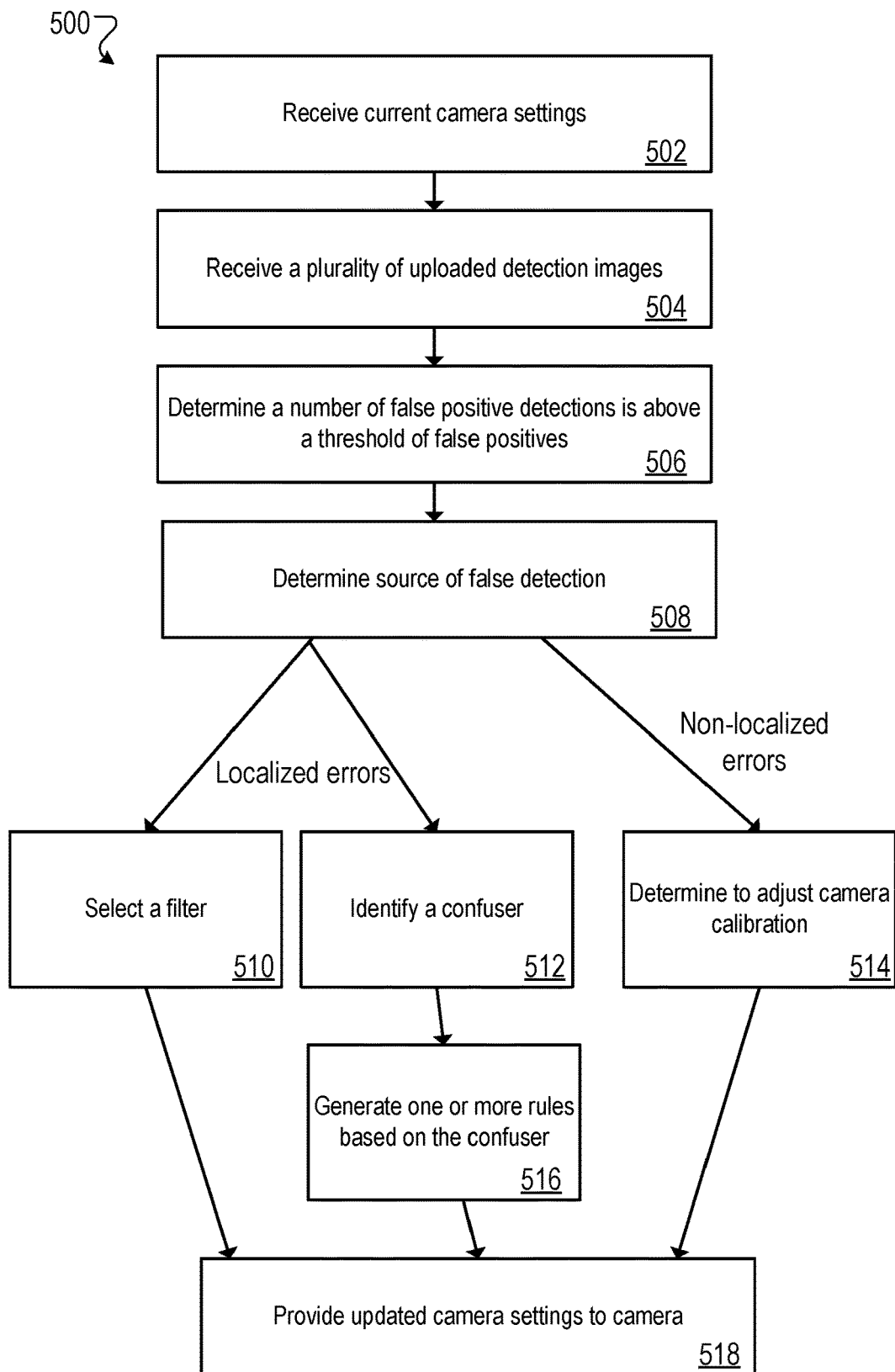
FIG. 5 is a flow diagram of an example process for determining localized and/or non-localized error sources for a dynamic camera calibration.

FIG. 5 is a flow diagram of an example process 500 for determining localized and/or non-localized error sources 404 by a dynamic camera calibration system (e.g., dynamic camera calibration system 402).

Current camera settings are received (502). A camera 410 may be installed with generic or default camera settings including a set of camera parameters and one or more of a filter 436 or rule 438 that might be specific to an outdoor setting or an indoor setting. The camera begins collecting imaging data 416 and the image detection software 412 uses stored camera settings 414 to determine positive detections (e.g., targets of interest are detected) of events. Imaging data 416 representing positive detections of a particular event by the camera 410 are uploaded to the dynamic camera calibration system 402.

A plurality of uploaded detection images are received (504). The validation engine 420 receives the uploaded detection images from the camera 410 and can process the images using neural networks/classifiers 430a. A process of image validation is described in more detail herein with reference to FIGS. 1, 2, and 3A.

A number of false positive detections above a threshold of false positive detections is determined (506). The re-calibration determiner 432 can determine that a number of false positive detections is above a threshold of false positive detections. The number of false positive detections may be received within a period of time for a camera 410 or a cumulative number of false positive detections received within a period of time for a set of multiple cameras 410. A number of false positive detections that is above a threshold of false positive detections can be a total number of false positive detections received from one or more cameras 410. A value of the threshold can depend, in part, on cost considerations, available bandwidth and processing power, and the like.

The determination to re-calibrate may depend on various factors, including one or more thresholds. For example, the determination to re-calibrate may be triggered by (i) a physical change to the camera 410, for example, the camera 102 may be moved (e.g., repositioned) or the camera 410 zoom and/or focal length may be altered, (ii) a number or frequency of "false positive" detections in the uploaded images from camera 410 may exceed a threshold amount or frequency, and/or (iii) a size or other attribute of the object (e.g., object 415) detected in the uploaded images has an associated measurement error exceeding a threshold (e.g., a dimension of the detected human targets is 20% off).

A source of the false positive detections is determined (508). A source of the false positive detections can be determined to be localized or non-localized. In general, a non-localized source of false positive detections can be attributed to a miscalibration of one or more camera parameters, as described above with reference to FIGS. 1, 2, 3A-B. A non-localized source of false positive detections can generate consistent false positive detections over time and where a location of a bounding box for the object that triggers the false positive detection may be location-independent. In general, a localized source of false positive detections can be attributed to a temporally and/or spatially localized error, where false positive detections may occur during a particular time (e.g., a time of day, or season), and/or bounding boxes for the objects that trigger the false positive detection may be in a consistent or near-consistent location relative to the camera 410 (e.g., bounding box surrounds same pixels within a set of captured images).

In some implementations, the source of false positive detections can be determined to be a localized error where the source is localized spatially and/or temporally. A spatially localized error is due to a source that is in a fixed or nearly fixed position relative to the camera 410, for example, in a same position in a field of view of the camera 410, or more generally, in a same position relative to a trigger of a surveillance device 406. A temporally localized error is due to a source that triggers an error periodically or on a regular or nearly regular basis of time. For example, a temporally localized error may occur at a same time (e.g., 5:00 PM) every weekday (e.g., Monday through Friday). In another example, a temporally localized error may occur every 30 minutes, every hour, every two weeks, or the like.

In some implementations, the false detection source determiner 434 can determine that a source of false positive detections is a localized error based in part on a temporal localization of the false positive detections, for example, that uploaded images from the camera 410 that are false positive detections are clustered in time and/or are occurring with a periodicity (e.g., every 10 minutes, once a day, etc.). For example, a false positive detection due solar glare occurs fifteen minutes before sunset every day. The false detection source determiner 434 can access third party data 407 (e.g., local weather data including sunrise/sunset data). In some implementations, the false detection source determiner 434 can determine that a first false positive detection from a particular surveillance device 406 is due to glare and trigger a change to the camera settings based on previous patterns from the particular surveillance device 406.

In some implementations, the dynamic camera calibration system 402 can determine that a source of false positive detection is a localized error based in part on a spatial localization of the false positive detections, for example, that uploaded images from the camera 410 that are false positive detection each has a bounding box surrounding an object that triggered the false positive detection that is in a consistent or near-consistent location (e.g., each of the bounding boxes has substantially overlapping pixels). For example, bounding boxes surrounding a moving swing from a swing set are in a bottom-left corner of each of the false positive detection images from a particular camera 410.

In some implementations, the dynamic camera calibration system 402 can generate, based on the determination that the source of false positive detection is a localized error, an updated set of camera settings to provide to the camera 410. The updated set of camera settings can include one or more of a filter 436 or rule 438. For example, the updated set of camera settings selected by the camera settings selector 428 for a camera 410 experiencing a snowstorm can include a filter 436 that reduces sensitivity to movement that can be caused by snowflakes passing through the field of view of the camera 410.

In some implementations, errors that are determined to be spatially and/or temporally localized can cause the dynamic camera calibration system 402 to select one or more filters 436 to provide to camera 410 (510). A filter 436 applied to a camera 410 can be a secondary or sub-calibration sent to the camera 410 that will update the stored camera settings 414 such that it more discerningly finds and tracks targets of interest 415 and subsequently uploads fewer false positive detections. The filters 436 can apply to the entire field of view of the camera 410. Filters 436 can include instructions to the camera 410 to ignore one or more of changes within a specific pixel value range, changes within a specific frequency range, or changes within a specific pixel region of a field of view of the camera 410. A filter 436 can be, for example, a low-light filter (e.g., at dusk or dawn), an infrared night filter (e.g., for use in the dark), a glare filter (e.g., to use when the sun it rising/setting in the camera field of view), a jitter filter (e.g., to use when it is windy), or the like.

Filters 436 can be, for example, saliency filters, motion-based filters (e.g., to filter out unusable movement patterns like a branch moving back-and-forth), size-based filters, size change (e.g., to filter out unusually quick changes in size such as a bug flying around a camera), contrast, saturation, hue, color, spatial filters (e.g., location or directional), temporal (e.g., short-lived targets), and the like. A combination of two or more filters 436 can be applied simultaneously. For example, a localized error can be a plant that tends to trigger false positive detections on a windy day. A combination of filters 436 can be a set of filters that ignores changes within a specific pixel value range, within a specific frequency range and within a specific pixel region. Once applied to the calibration of the surveillance device 406 (e.g., stored camera settings 414), the camera will use the filter to determine whether or not to upload a positive detection to the dynamic camera calibration system 402.

In some implementations, the dynamic camera calibration system 402 can provide instructions to camera 410 to periodically apply a filter 436, e.g., for a duration of a temporally localized error source. For example, a filter 436 can be included in the camera settings 414 for a particular amount of time (e.g., every day from 6:00-8:00 PM). A filter 436 can be applied for a range of time on a pre-determined schedule, e.g., to compensate for regularly occurring localized errors (e.g., sunset that causes glare). In one example, a camera 410 may apply filter 436 for low light conditions that occur every day at a same time (e.g., 8:00 PM) and for a same range of time (e.g., for 12 hours).

In some implementations, the dynamic camera calibration system 402 will provide instructions to camera 410 to apply a filter 436 for a duration of a temporally localized error source, e.g., inclement weather. The dynamic camera calibration system 402 can use third party data 407, e.g., weather data, to determine a duration of inclement weather, and instruct the camera 410 to apply the provided filter 436 for the duration of the inclement weather. For example, third-party data 407 can indicate that home 408 is experiencing a storm such that the dynamic camera calibration system 402 provides a filter 436 to one or more surveillance devices 406 until the storm has passed. Alternatively, or additionally to using third-party data 407, the false detection source determiner 434 can determine, based on uploaded imaging data 416, that camera 410 is experiencing inclement weather. For example, the false detection source determiner 434 can detect that the camera 410 has switched into IR mode (e.g., indicating low light conditions) during the daytime, which can be indicative of severe weather condition reducing daylight. In another example, a false detection source determiner 434 can detect streaks from snow/rain being illuminated by IR LEDs of camera 410 and classify the inclement weather.

In some implementations, detection patterns and/or movement patterns can be used to identify localized error sources. For example, raindrops in a field of view of a camera 410 can be detected as many small targets that are moving fast and in a straight line across the field of view of the camera, and can cause a large number of false positive detections in a short period of time. In another example, an insect can be detected as a bright blob of color that moves quickly through the field of view of camera 410 in a non-linear pattern.

In some implementations, the dynamic camera calibration system 402 will provide instructions to camera 410 to apply a filter 436 for a set amount of time. After a determined amount of time, the dynamic camera calibration system 402 may instruct the camera 410 to remove the filter 436 and analyze the positive detections provided by camera 410 to determine if the localized error source is continuing to cause false positive detections above a threshold number of false positive detections. More details regarding evaluating camera settings is discussed below with reference to FIG. 7.

In some implementations, errors that are determined to be spatially and/or temporally localized can cause the system to identify a confuser (512). A confuser is a localized error that is spatially constrained within a detection range of a monitoring device (e.g., field of view of camera 410) that causes false positive detections by the surveillance device 406. In some implementations, a confuser may retain a similar shape and/or be detected in a same location relative to a field of view of a camera 410 between false positive detections by camera 410. A confuser can be a same object or same type of stimuli that causes false positive detections for one or more surveillance devices 406. A confuser can be, for example, a spider web built within a portion or all of the field of view of camera 410, reflections in vehicle windows (e.g., duplicating targets of interest), or a shadow created by a same tree in the field of view of camera 410. In another example, a confuser can be a birdfeeder (e.g., swinging around due to a visit by a bird or squirrel), moving tarps, swing sets, or the like.

A confuser can be isolated by the dynamic camera calibration system 402 using a dynamic exclusion area. A dynamic exclusion area can be defined by an area of pixels of images in the imaging data 416 wherein any targets of interest identified by the image detection software 412 are excluded from detection. The dynamic exclusion area can be defined and excluded from the detection by the image detection software 412 of camera 410 by one or more rules 438 that are included in the stored camera settings 414 of camera 410.

In some implementations, a K-means clustering algorithm with a very tight Euclidean value is used to tightly restrict the dynamic exclusion area. Objects whose path can be tracked through a field of view of camera 410 crossing through the dynamic exclusion area are differentiated from objects whose movements originate from within the dynamic exclusion area, such that objects crossing through the dynamic exclusion area can be retained (e.g., as possible targets of interest) and objects whose movements originates within the dynamic exclusion zone are ignored (e.g., as confusers). For example, a dynamic exclusion area can include a confuser that is a birdfeeder such that a human target crossing in front of the birdfeeder would be retained to possibly trigger a detection, but the movement of the birdfeeder itself would be ignored.

In some implementations, clustering techniques including proximity clustering can be used to train models using supervised learning to detect localized errors that are confusers. For example, a machine-learning model can be trained using uploaded data from camera 410 to define a particular region (e.g., define a bounding box in received imaging data 416) that is a source of a localized error. The machine-learning model may also define one or more movement vectors of a target of interest between subsequent imaging data 416 frames (e.g., a branch moving in the field of view of camera 410) to determine that the movement vectors of the source are not classified as human-like.

In some implementations, one or more neural networks can be used to generate confuser models that can be used to identify a confuser in uploaded image data that is determined to be a false positive detection. For example, a confuser model for a spider web can be trained with data that includes a number of false detection events that occur with spider webs over a set period of time and a type of spatial localization of the false detection events associated with spider webs. For example, "most spider events have X number of false detection events over Y number of hours," "most spider events are located within six inches of the camera lens," or "for this camera, most spider events are in the left third of the camera image."

In some implementations, a corpus of labeled data is collected including image data that is labeled to identify whether or not a spider/spider web is present, and used to train one or more neural networks using supervised learning. The labeled data may be generated based on output of the dynamic camera calibration system 402 and/or based on human input (e.g., user feedback, human expert labeling, etc.). Once trained, the one or more neural networks can be used to determine a presence of spider webs in new detection images and/or detect and localize spider webs within a frame of camera 410. For example, a convoluted neural network (CNN) can be trained to recognize an overall pattern of a spider web in the full frame of the camera 410 or cut out smaller sub-images from the frame to try to recognize the appearance of a moving strand of spider web. In another example, a recurrent neural network (RNN) or another type of neural network can be trained to recognize the motions of a moving spider web.

In some implementations, a data science approach can be used to determine sources of localized errors including confusers. A large amount of metadata is collected from a camera, such that information about the camera's behavior can be determined from the metadata that is stored. Metadata can include all true positive and false positive bounding boxes including the classifications and non-classifications, all timestamps associated with detection events. Patterns can be determined for false positive detections at particular times of day and/or within certain clustered areas within a field of view of the camera 410, and filters 436 can be created based on the patterns determined in the collected metadata. Representative images for determined patterns can be provided to a neural network to identify a source of the localized errors.

In some implementations, semantic scene segmentation can be utilized (e.g., by the dynamic camera calibration system 402) on multiple uploaded detection images from a camera 410 in order to divide a scene into multiple regions, for example, an outdoor scene can be divided into a lawn, a street, a sidewalk, trees, sky, etc. One or more rules 438 can be generated by the filter/rule generator 422 that are responsive to particular regions. For example, a rule 438 related to trees can include ignoring movement related to branches. Particular camera settings including one or more rules 438 can be sent to the camera 410 depending on which regions are determined to be in the field of view of the camera 410.

One or more rules 438 are generated based on the confuser (516). The filter/rule generator 422 can receive metadata from the false positive detections collected by the validation engine 420 and generate one or more rules 438. Metadata can include, for example, time of day of detections, frequency of detections, location of detections (e.g., location in field of view of camera 410), or the like. For example, metadata for a shadow cast by a tree branch can include a time of day when the shadow appears, a pixel location in the field of view of one or more cameras 410 of the shadow, and approximate movement of the shadow (e.g., due to wind moving the tree branch).

In some implementations, a rule 438 can define pixel exclusion, e.g., disregarding a pixel region that includes the confuser in the camera 410 field of view. In other words, a rule 438 can include instructions to the camera 410 to exclude an area of pixels in images captured by the camera 410. For example, a rule 438 may be to ignore a pixel region that is X by Y pixels in size within which a spider web is detected by the dynamic camera calibration system 402. In another example, a rule 438 may be to ignore a pixel region that is A by B pixels in size in a particular region of the field of view of the camera 410 that corresponds to a reflection from a mirror or a television screen.

In some implementations, a rule 438 can define a size of a confuser such that the camera 410 is instructed to ignore any targets of interest that are of a particular size, smaller than a particular size, or larger than a particular size within the field of view of camera 410. For example, a rule 438 may be to ignore a detected target of interest that is smaller than Q by W pixels in size. In some implementations, a rule 438 can define a bounding box surrounding an object that is not of interest such that the camera 410 may utilize the rule to ignore objects that fit within the defined bounding box.

Instructing the camera 410 to ignore pixels corresponding to a confuser within a particular bounding box may include training a specific model for the confuser such that the image detection software 412 would treat the pixels in which the confuser appears as background. For example, a tarp can be a confuser in a field of view of a camera 410 where the tarp flapping in the wind can trigger false positive detections. The dynamic camera calibration system 402 may generate a model for the tarp that includes, for example, defining a specific manifold in color space that the moving tarp will cycle through as it moves, movement of the tarp, and the like. A rule 438 may be generated to instruct the image detection software to not consider the pixels are that are determined to part of the confuser (e.g., in a dynamic exclusion area) when determining a target of interest, where the confuser is defined in part by the model. In another example, a target of interest (e.g., a human) that includes colors that are similar to the tarp and that passes in between the tarp and the camera 410 could be detected as foreground by the image detection software 412 using pixels imaging the target of interest that are not of the same colors as the tarp. As described above, the system 102 can make a distinction between a source of movement that originates outside of a dynamic exclusion area and a source of movement that originates from within the dynamic exclusion area (e.g., the confuser).

In some implementations, a rule 438 can define one or more types of movements by a potential target of interest or trigger patterns to exclude from being used by the camera 410 to identify potential targets of interest. A type of movement by a potential target of interest can be, for example, a speed at which a target of interest passes through a field of view of camera 410 (e.g., outside a normal range of walking/running by a human), an interval between triggers of two adjacent tripwires, or another measurement of movement by one or more of the surveillance devices 406 (e.g., camera 410) that is indicative of a velocity of movement of the target of interest within the pixel space of the camera 410. Camera calibration with respect to a size of a human target and a relative understanding of the ground plane of the scene viewed by the camera 410 can be used to make assumptions about a velocity that an object can have when moving through a field of view of the camera 410.

A trigger pattern can be a set of detection triggers with descriptive temporal or inherent characteristics, e.g., that occur over a determined amount of time and that reflect non-human or non-target of interest behavior (e.g., the frequency of the triggers is not reflective of human behavior). For example, a tripwire may be triggered to record detections a threshold number of times in a set period such that it does not reflect how a human target would trigger the tripwire. A trigger pattern can be a velocity of movement for a target of interest, for example, a determine velocity that a human will move through a field of view of the camera 410.

In some implementations, each individual target of interest is tracked through a field of view of the camera 410 and a tolerance is set (e.g., based on time) for a same target to trigger a same tripwire more than once within a timeframe (e.g., 5 minutes). In one example, a tolerance for one trigger of the tripwire by a human target may be once every 2 minutes. Additional triggers of a same tripwire by the human target can be discarded (e.g., the human target is standing next to the tripwire and constantly triggering it).

Errors that are determined to be non-localized can cause the dynamic camera calibration system 402 to determine to adjust the camera settings, including one or more camera parameters (514). In some implementations, adjusting the camera settings includes updating the camera calibration including a set of camera parameters, as described in detail above with reference to FIGS. 1, 2, 3A and 3B.

Updated camera settings are provided to the camera (518). Camera settings selector 428 can select from one or more rules 438, one or more filters 436, and/or stored camera calibrations 440 to provide to camera 410. In some implementations, certain algorithms (e.g., image detection software algorithms) can be turned on/off or replaced with a different algorithm better suited to the camera 410.

In some implementations, the updated camera settings can be used to verify future detections of events captured by the camera 410, where the detections are based on the previous set of camera settings and are subsequently verified by the updated set of camera settings. In doing so, the images that are determined to be detections of a particular event using the previous camera settings may be determined to be false detections by the updated camera settings in a verification step (e.g., detections can be filtered out by filter 436 and/or rule 438), and thus not uploaded to the dynamic camera calibration system 402 or provided to a user as an alert. For example, a camera with a first set of camera settings can detect in a set of images a human detection event (e.g., a potential burglar), but when verified by the updated camera settings including a filter 436 which filters out shadows caused by tree branches at sunset, the human detection event is determined to not be a detection. Detections in images captured by the camera 410 that are verified by the updated set of camera settings can be then selectively provided to the user, for example, only in the case that the detections are verified as true positive detections.

Updated camera settings can be provided to the camera 410 including additional instructions for a period of time to apply the update camera settings. For example, a filter 436 can be provided to the camera 410 along with instructions to apply the filter to the camera 410 for a period of 2 hours.

In some implementations, camera settings selector 428 can pre-emptively select to send updated camera settings 414 to camera 410. A pre-emptive selection to send updated camera settings 414 can depend in part, for example, on a pre-defined schedule. A pre-defined schedule can define two or more different sets of camera settings 414 that should be utilized by the camera 410 depending on a time of day. For example, a daytime camera calibration setting and a night-time camera calibration setting. In another example, a camera settings selector 428 can provide a separate camera calibration setting including a glare-reducing filter, for a period of time in which the setting sun creates glare in the field of view of the camera 410.

In some implementations, the dynamic camera calibration system 402 can determine that one or more false positive detections from a surveillance device 406 has similar or same metadata (e.g., occurring under similar conditions) as a previously identified false detection scenario. The dynamic camera calibration system 402 can determine to send updated camera settings to the surveillance device 406 including, for example, one or more rules 438 or filters 436. For example, on a first day, the dynamic camera calibration system 402 determines that a surveillance device 406 has uploaded a set of 10 false positive detections within a span of an hour. A filter 436 is generated by the filter/rule generator 422 and provided to the surveillance device 406 to be applied for a set amount of time. On a subsequent day, the dynamic camera calibration system 402 can determine that a same surveillance device 406 has uploaded two false positive detections under similar operating conditions as on the first day. The dynamic camera calibration system 402 can determine to provide a same filter 436 to the surveillance device 406 based on the knowledge of the first day. In some implementations, the dynamic camera calibration system 402 can provide the same filter 436 to the surveillance device 406 without waiting for a number of false positive detections to exceed a threshold of false positive detections.

In some implementations, the dynamic camera calibration system 402 can determine that a second different surveillance device 406 has uploaded two false positive detections under similar conditions as what was detected on the first surveillance device 406 and can provide the same filter 436 to the second different surveillance device 406. For example, if multiple different surveillance devices 406 (e.g., for a home, for a neighborhood, for a geographical region, etc.) are determined to be experiencing a same localized error (e.g., a snowstorm), the dynamic camera calibration system 402 can provide a same filter 436 to each of the multiple surveillance devices 406 without necessarily checking the false positive detections in uploaded detections from each of the multiple surveillance devices 406.

Multiple cameras can each upload false positive detections that are related to a same localized error source. For example, cameras with overlapping fields of view can each detect and upload a localized error to produce a false positive detection. The dynamic camera calibration system 402 may consider these false upload detections cumulatively and determine to re-calibrate based on a threshold number of false positive detections from the group of multiple cameras. In another example, if the dynamic camera calibration system 402 determines that a filter needs to be applied to one camera 410 of the group of multiple cameras, it may preemptively push down the same filter to other cameras of the set (e.g., in the case of a snowstorm) for localized error sources 404 that affect each of the multiple cameras.

Figure 6:
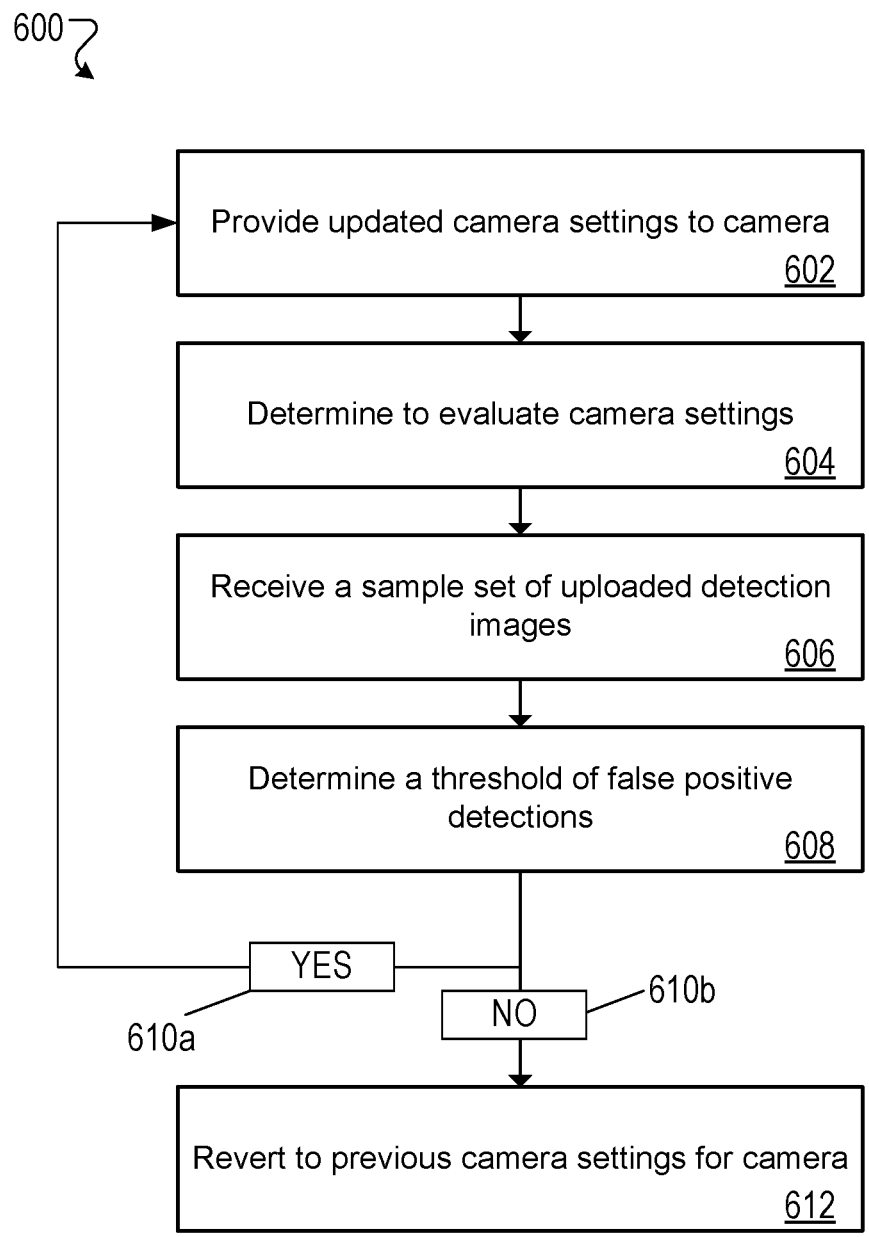
FIG. 6 is a flow diagram of an example process for evaluating camera settings.

FIG. 6 is a flow diagram of an example process 700 for evaluating camera settings. The dynamic camera calibration system 402 can provide updated camera settings to the camera 410 (602). The updated camera settings can be provided, for example, after the dynamic camera calibration system 402 determines that a camera 410 has uploaded a number of false positive detections that exceeds a threshold number of false positive detections. In another example, the updated camera settings can be provided pre-emptively (e.g., prior to a detection of a threshold number of false positive detections) to the camera 410 by the dynamic camera calibration system 402.

The dynamic camera calibration system 402 can provide the updated camera settings to the camera 410 including an expiration time or a duration for which to apply the updated settings. The dynamic camera calibration system 402 can then evaluate the updated camera settings and/or provide instructions to the camera 410 to revert to a previous camera calibration setting. For example, the updated camera settings can be applied to a camera 410 for a duration of 2 hours after which the dynamic camera calibration system 402 can evaluate a current status of the camera 410.

The dynamic camera calibration system 402 determines to evaluate the camera settings (604). The determination to evaluate camera settings can include determining that a source of a localized error is no longer present (e.g., in the field of view of camera 410). The dynamic camera calibration system 402 can determine that inclement weather (e.g., ice storm) has ended, for example, around the home 408, a neighborhood, a geographical region, using, for example, third-party weather data.

In some implementations, the determination to evaluate camera settings can include an expiration of a set time for the updated camera settings that are provided to the camera 410. For example, the updated camera settings can be provided to camera 410 with instructions to use the updated camera calibrations settings for 1 day. The dynamic camera calibrations system 402 can determine that the 1-day period has passed and determine to evaluate the camera settings.

In some implementations, the camera settings can be evaluated on a periodic basis (e.g., once a day, every 2 hours, etc.) or based in part on a change in environmental or ambient conditions (e.g., at sunset/sunrise, during inclement weather). After the dynamic camera calibration system 402 has provided updated camera settings 414 to the camera 410 responsive to a determination that the camera 410 has uploaded more than a threshold number of false positive detections, for example, due to a localized error (e.g., inclement weather), the dynamic camera calibration system 402 can periodically determine if the localized error is still present in the field of view of the camera 410.

In some implementations, evaluating the camera settings includes reverting to a previous set of camera settings. Reverting to previous camera settings can include removing one or more filters 436 and/or one or more rules 438 from the stored camera settings 414 of the camera 410. For example, the dynamic camera calibration system 402 can provide a filter 436 to camera 410 in response to determining that the camera is uploading false positive detections triggered by a localized error source 404. In order to evaluate the camera settings, the dynamic camera calibration system 402 may provide instructions to the camera 410 to remove filter 436.

In some implementations, reverting to a previous camera calibration setting includes backing off of a filter 436 (e.g., using a step-wise function) such that the sensitivity of the filter 436 is reduced from most-sensitive to least-sensitive and/or slowly removing the one or more rules 438 applied to the camera settings 414. For example, reducing an amount of background noise suppression, reducing an amount of smoothing of movements in an image, or the like. By slowly reducing an amount of image filtering by the image detection software 412, a sensitivity to one or more potential localized error sources 404 can be slowly introduced without uploading a large volume of false positive detection images to the dynamic camera calibration system 402, reducing traffic at the dynamic camera calibration system 402.

In some implementations, if at any one step in the process of reverting to previous camera settings a false detection occurs, the camera settings can be reverted to a prior step. For example, one level of sensitivity is reverted for filter 436 and/or one rule 438 is added back on after receiving a false positive detection rather than waiting for a number of false positive detections to exceed a threshold of false positive detections as required during normal operation.

A sample set of uploaded detection images using the previous camera settings are received from the camera 410 (606). The validation engine 420 can collect the sample set of uploaded detection images from camera 410 where camera 410 is using previous camera settings.

A threshold of false positive detections is determined (608). The dynamic camera calibration system 402 can determine that number of false positive detections exceeds a threshold of false positive detections (610a). The sample set of uploaded detections images can be validated by the validation engine 420 and a determination can be made by the validation engine 420 whether or not a number of false positive detections in the sample set of uploaded detection images is less than a threshold of false positive detections. For a number of false positive detections in the sample set that are determined above the threshold, the dynamic camera calibration system 402 can provide instructions to the camera 410 to maintain the updated camera settings 414 including the one or more filters and/or one or more rules 438.

The dynamic camera calibration system 402 can determine that a number of false positive detections does not exceed a threshold of false positive detections (610b). For a number of false positive detections in the sample set that are determined below the threshold, the dynamic camera calibration system 402 can provide instructions to the camera 410 to revert to the previous camera settings.

In some implementations, the validation engine 420 can determine that a number of false positive detections in the sample set of images from the camera 410 using the previous camera settings satisfies a camera setting reversion criteria. The camera setting reversion criteria can be a determination that the number of false positive detections in the sample set of images from the camera is less than a threshold number of false positive detections. In some implementations, if the camera setting reversion criteria is met, then the camera is instructed to revert to the previous set of camera settings, and if the camera setting reversion criteria is not met, then the camera is instructed to maintain the updated set of camera settings.

In some implementations, camera settings are reverted to previous camera settings for the camera (612). The camera settings selector 428 can select a previously provided set of camera settings, for example, from the stored camera calibrations 440, rules 438, and filters 436 and deliver the camera settings to camera 410. Camera settings can include one or more camera parameters (e.g., physical parameters), one or more filters 436, and one or more rules 438 for the camera 410.

In some implementations, not all calibration settings can be reverted to previous camera settings for the camera 410 each time. For example, only the temporal settings (e.g., snowstorm settings) can be reverted when the storm ends, and the camera settings such as height/angle, exclusion zones, etc., may not change based on the end of a snowstorm.

In some implementations, multiple different camera settings can be stored locally at the camera 410. A camera 410 may store multiple different camera settings, for example, for different lighting schemes (e.g., day, night, sunrise/sunset), different weather patterns (e.g., stormy and clear), different levels of security/sensitivity (e.g., high secure mode, low secure mode, etc.), or the like. For example, a camera 410 may have a first set of camera settings for when a homeowner is at home (e.g., low security, low sensitivity settings), and a second set of camera settings for when the homeowner is away from home (e.g., high security, high sensitivity settings).

In some implementations, reverting to previous camera settings for the camera 410 include providing instructions, by the camera settings selector 428, to the camera to remove one or more filters 436 and/or rules 438 that have been applied to the camera 410. For example, the camera settings selector 428 can provide instructions to camera 410 to revert to previous camera settings by removing a rule 438 related to a confuser in a field of view of a camera 410. Other triggers to revert to previous camera settings can include determining that a specific time has elapsed, the camera 410 has changed modes of operation (e.g., IR mode on/off), a time of day, a user setting, an arming/disarming of the home monitoring system, an arrival/departure of a homeowner or other user, etc. A trigger can be sent by a third-party, for example, Alarm.com.

Figure 7:
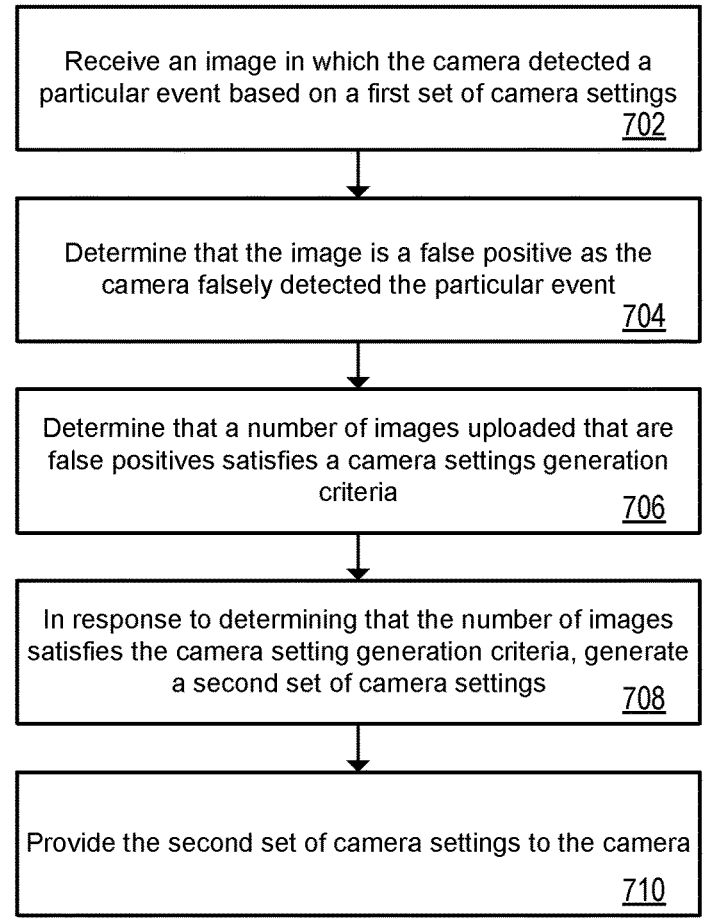
FIG. 7 is a flow diagram of an example process for updating camera settings.

FIG. 7 is a flow diagram of an example process 700 for updating camera settings 414. An image is received in which the camera 410 detected an event based on a first set of camera settings 414 (602). The camera can be a security camera outside a home, business, school, or the like. In one example, the event can be a human detected in the vicinity of a home (e.g., a delivery person, a trespasser, a visitor, etc.) or a car detected in a driveway or along the street outside the home. The first set of camera settings can include, for example, a set of camera calibration 440 (e.g., camera parameters 104), filters 436, and rules 438. Images collected by the camera 410 can be processed using image detection software and a detection event can be determined. The camera can provide the detection image to the dynamic camera calibration system 402 over network 418.

The image is determined to be a false positive as the camera falsely detected the event (704). The validation engine 420 can determine, using the neural networks/classifier 430a, that the event detected in the uploaded detection image is a false positive. For example, the dynamic camera calibration system 402 can determine that the event (e.g., a delivery person at the front door) is a false positive.

In some implementations, determining that the image is a false positive includes determining a bounding box for an object in the image. A bounding box for an object can be a bounding box including a head point and a foot point for a human object. Based on the bounding box for the image, determining a classification for the object in the image. The classification can be based in part on size, orientation, movement, or the like. For example, a human object tends to be between 5-7 feet in height, standing with the foot point on the ground, and moving in a relatively slow manner.

When the classification for the object in the image does not match a provided classification of the object determined by the camera, then the image is a false positive. In some implementations, determining the classification for the object is performed by a neural network 430a. Further details about the false positive determination and classification are described above with reference to FIGS. 1-6.

A number of images that are uploaded that are false positive is determined to satisfy a camera settings generation criteria (706). Satisfying the camera settings generation criteria can be, for example, a number of images that are false positives exceeding a threshold frequency of false positives. For example, a threshold frequency can be five false positives in a 24 hours period. In another example, a threshold frequency can be 2 false positives in less than a five minute span of time.

In some implementations, the camera settings generation criteria includes a number of false positive images exceeding a threshold number of false positive images. A threshold number of false positive images can be, for example, 10 total false positive images, 100 total false positive images, or the like.

In response to determining that the number of images that are uploaded and that are false positives satisfies the camera settings generation criteria, a second set of camera settings is generated (708). In some implementations, generating the second set of camera settings includes determining a change to a set of physical camera parameters. The set of physical camera parameters can include camera mounting height, camera tilt-up angle, and camera focal length. For example, the camera physical parameters can be updated based on a determination that the false positives are due to the camera being moved. More details about updating the set of physical camera parameters is discussed with reference to FIGS. 1-3B.

In some implementations, the second set of camera settings can be a second set of multiple different sets of camera settings that can be generated responsive to determining that the number of images that are uploaded and that are false positives satisfies the camera settings generation criteria. The multiple different sets of camera settings can be dynamic and/or custom configurations for each camera of multiple different cameras and for multiple different scenarios (e.g., different operating conditions). In some implementations, the multiple sets of camera settings can be an iterative set of camera configurations including modifications to various configurable parameters (e.g., filters 436, rules 438, or other parameters). Additionally or alternatively, the second set of camera settings can be one of a set of multiple different sets of camera settings that can be iteratively generated responsive to determining that the number of images that are uploaded and that are false positives repeatedly satisfies the camera settings generation criteria.

In some implementations, generating the second set of camera settings includes determining a change to operating conditions of the camera. Operating conditions of the camera can include, for example, weather changes (e.g., a snowstorm, rain, windy), lighting changes (e.g., daylight, twilight), or the like. Operating conditions can be localized errors that may require a second set of camera settings including one or more filters 436 and/or rules 438. Further details related to localized errors due to operating conditions are discussed with reference to FIGS. 4-6.

In some implementations, generating the second set of camera settings includes determining that a size or other attribute of an object detected in the uploaded image that is determined to be a detection has an associated measurement error exceeding a threshold. In one example, a size of a human target or vehicle object of interest can be outside a nominal expected range. For example, a human target can have a nominal range of 5-7 feet tall. If a size of a human target detected in the uploaded image is determined to be 9 feet tall, the associated measurement of error can be in excess of a threshold of human target height (e.g., +/−2 feet).

In some implementations, the second set of camera settings is generated using a neural network by processing a set of images in which the neural network has verified that the detections of the particular event in the set of images are true positives and where the neural network generates updated camera parameters using the set of images that are true positives.

The second set of camera settings is provided to the camera (710). Camera settings selector 428 can select from one or more rules 438, one or more filters 436, and/or stored camera calibrations 440 to provide to camera 410. In some implementations, certain algorithms (e.g., image detection software algorithms) can be turned on/off or replaced with a different algorithm better suited to the camera 410. Further details about providing the second (e.g., updated) set of camera settings are described above with reference to FIGS. 1-6.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   receiving, from a camera, an image in which the camera detected a particular event based on a first set of camera settings;
   determining, from the image, that the image is a false positive detection as the camera falsely detected the particular event;
   determining that a number of false positive detections in a set of images uploaded by the camera meets a threshold for false positive detections, and in response:
   triggering a camera setting recalibration process, the camera setting recalibration process comprising:
   generating a second, different set of camera settings; and
   providing the second set of camera settings to the camera.

2. The method of claim 1, wherein generating the second set of camera settings further comprises one or more of determining (i) a change to a set of physical camera parameters, (ii) a change in operating conditions, or (iii) a size or other attribute of an object detected in the uploaded images has an associated measurement error exceeding a threshold.

3. The method of claim 2, wherein the set of physical camera parameters including camera mounting height, camera tilt-up angle, and camera focal length.

4. The method of claim 1, wherein determining that the number of false positive detections in the set of images uploaded by the camera meets a threshold for false positive detections includes determining that the number of false positive detections in the set of images exceed a threshold frequency of false positives.

5. The method of claim 1, wherein determining that the image is a false positive includes:
   determining a bounding box for an object in the image;
   determining, based on the bounding box for the image, a classification for the object in the image; and
   determining, that the classification for the object in the image does not match a provided classification of the object determined by the camera.

6. The method of claim 5, wherein determining the classification for the object is performed by a neural network.

7. The method of claim 1, wherein the second set of camera settings is generated using a neural network by processing a set of images in which the neural network has verified that the detections of the particular event in the set of images are true positives and wherein the neural network generates updated camera parameters using the set of images that are true positives.

8. The method of claim 1, wherein the image in which the camera detected the particular event based on the first set of camera settings is one of a plurality of images or a frame of a plurality of frames of a video captured by the camera.

9. The method of claim 1, wherein the second set of camera settings are an incremental adjustment of the first set of camera settings.

10. The method of claim 9, further comprising:
    receiving, from the camera, a set of images in which the camera detected the particular event based on the second set of camera settings;
    determining that a number of false positive detections in the set of images made by the camera based on the second set of camera settings meets a threshold for false positive detections;
    in response to determining that the number of false positive detections in the set of images uploaded by the camera meets a threshold for false positive detections, generating a third set of camera settings; and
    providing the third set of camera settings to the camera.

11. The method of claim 1, wherein determining that the number of false positive detections in the set of images uploaded by the camera meets a threshold for false positive detections comprises determining whether the images uploaded by the camera that are false positives matches a pattern of false positives.

12. The method of claim 11, wherein determining whether the images uploaded by the camera that are false positives matches a pattern of false positives comprises determining that the images uploaded by the camera correspond to a pattern of three false positives uploaded in a row.

13. The method of claim 11, wherein determining whether the images uploaded by the camera that are false positives matches a pattern of false positives comprises determining that the images uploaded by the camera correspond to a pattern of a first number of false positive detections versus a second number of true positive detections uploaded by the camera.

14. A system comprising:
a data processing apparatus; and
a non-transitory computer readable medium storing instructions executable by the data processing apparatus and thus upon such execute cause the data processing apparatus to perform operations comprising:
receiving, from a camera, an image in which the camera detected a particular event based on a first set of camera settings;
determining, from the image, that the image is a false positive as the camera falsely detected the particular event;
determining that a number false positive detections in a set of images uploaded by the camera meets a threshold for false positive detections, and in response:
triggering a camera setting recalibration process, the camera setting recalibration process comprising:
generating a second, different set of camera settings; and
providing the second set of camera settings to the camera.

15. The system of claim 14, wherein generating the second set of camera settings further comprises one or more of determining (i) a change to a set of physical camera parameters, (ii) a change in operating conditions, or (iii) a size or other attribute of an object detected in the uploaded images has an associated measurement error exceeding a threshold.

16. The system of claim 14, wherein determining that the number of false positive detections in the set of images uploaded by the camera meets a threshold for false positive detections includes determining that the number of false positive detections in the set of images exceed a threshold frequency of false positives.

17. The system of claim 14, wherein determining that the image is a false positive includes:
determining a bounding box for an object in the image;
determining, based on the bounding box for the image, a classification for the object in the image; and
determining, that the classification for the object in the image does not match a provided classification of the object determined by the camera, and wherein determining the classification for the object is performed by a neural network.

18. The system of claim 14, further comprising:
receiving, from the camera, a set of images in which the camera detected the particular event based on the second set of camera settings;
determining that a number of false detections in the set of images made by the camera based on the second set of camera settings meets a threshold for false positive detections;
in response to determining that the number of false positive detections in the set of images uploaded by the camera meets a threshold for false positive detections, generating a third set of camera settings; and
providing the third set of camera settings to the camera.

19. At least one non-transitory computer-readable storage medium having stored thereon instructions which, when executed by at least one processor, cause performance of operations comprising:
receiving, from a camera, an image in which the camera detected a particular event based on a first set of camera settings;
determining, from the image, that the image is a false positive as the camera falsely detected the particular event;
determining that a number of false positive detections in a set of images uploaded by the camera meets a threshold for false positive detections, and in response:
triggering a camera setting recalibration process, the camera setting recalibration process comprising:
generating a second, different set of camera settings; and
providing the second set of camera settings to the camera.

* * * * *

UNITED STATES PATENT AND TRADEMARK OFFICE
CERTIFICATE OF CORRECTION

PATENT NO. : 11,012,683 B1
APPLICATION NO. : 16/145798
DATED : May 18, 2021
INVENTOR(S) : Allison Beach et al.

Page 1 of 1

It is certified that error appears in the above-identified patent and that said Letters Patent is hereby corrected as shown below:

In the Claims

Claim 14, Column 31, Line 15, after "positive" insert -- detection --.

Claim 14, Column 31, Line 17, after "number" insert -- of --.

Claim 19, Column 32, Line 30, after "positive" insert -- detection --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*